US006554196B2

(12) United States Patent
Sasayama et al.

(10) Patent No.: US 6,554,196 B2
(45) Date of Patent: Apr. 29, 2003

(54) TEMPERATURE CONTROL DEVICE

(75) Inventors: Kuboyuki Sasayama, Yotsukaido (JP); Kazuya Sato, Niiza (JP); Masahiro Kawai, Kawaguchi (JP)

(73) Assignees: Nishiyama Corporation, Tokyo (JP); AQUAtech Co., Ltd., Saitama (JP)

( * ) Notice: Subject to any disclaimer, the term of this patent is extended or adjusted under 35 U.S.C. 154(b) by 73 days.

(21) Appl. No.: 09/845,131

(22) Filed: Apr. 30, 2001

(65) Prior Publication Data

US 2001/0037652 A1 Nov. 8, 2001

(30) Foreign Application Priority Data

May 2, 2000 (JP) .................................. 2000-133616
Oct. 31, 2000 (JP) .................................. 2000-332716
Mar. 28, 2001 (JP) .................................. 2001-093174

(51) Int. Cl.[7] ........................... G05B 11/32; F25B 29/00
(52) U.S. Cl. ................... 236/12.12; 62/201; 236/78 D; 700/30
(58) Field of Search ...................... 236/780 D; 165/260, 165/263; 62/201; 700/30 Y

(56) References Cited

U.S. PATENT DOCUMENTS 5,697,436 A * 12/1997 Johnson et al. ............. 165/254
6,148,626 A     11/2000 Kazuki ....................... 62/180
6,373,033 B1 *  4/2002 De Ward ................... 219/497

FOREIGN PATENT DOCUMENTS

JP    09-089436    4/1997   ........... F25D/17/02
JP    11-183005    6/1999   ............ F25D/9/00

* cited by examiner

*Primary Examiner*—William Wayner
(74) *Attorney, Agent, or Firm*—Woodbridge & Associates, P.C.; Richard C. Woodbridge, Esq.; Thomas J. Onka, Esq.

(57) ABSTRACT

The controller 70 of the brine supply device 10 performs the PID calculation of the manipulated variable MV of the valve 14, calculates the compensated manipulated variable MV' by compensating the manipulated value MV, and controls the operation of the valve 14 based on the compensated manipulated variable MV'. The variation $\Delta MV$ of the manipulated variable MV becomes proportional to the variation $\Delta PV$ of the brine supply temperature Pt1 as the operation of the valve 14 is controlled with the compensated manipulated variable MV'. This makes it possible to control temperature with a high accuracy using only one set of PID constants.

9 Claims, 17 Drawing Sheets

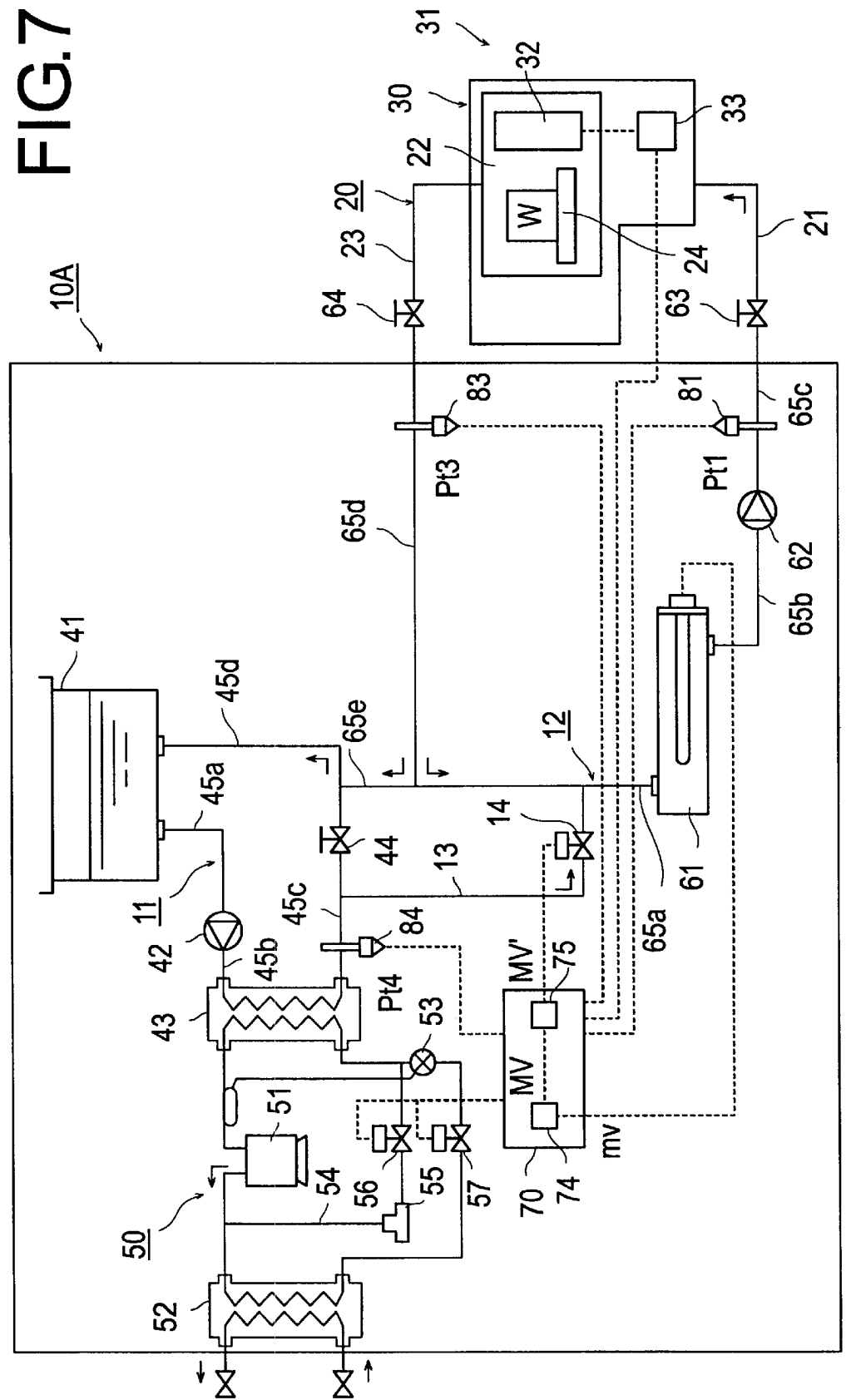

TEMPERATURE CONTROL DEVICE

This application is based on Japanese Patent Application Nos. 2000-133616, 2000-332716 and 2001-93174 filed on May 2, 2000, Oct. 31, 2000 and Mar. 28, 2001, the contents of which are hereby incorporated by reference.

BACKGROUND OF THE INVENTION

1. Field of the Invention

The invention relates to a temperature control apparatus that adjusts the temperature of a heating medium supplied to a load or the temperature of the load itself.

2. Description of the Related Art

For processes of manufacturing liquid crystal panels or semiconductors, it is an essential requirement to be able to control temperatures, so that various temperature control devices are used. Some of those temperature control devices use brine supply devices. This kind of brine supply devices supply a temperature controlled heating medium, i.e., brine, to a load circuit, where the works, such as LCD panels, are disposed as a load, in order to maintain the temperature of the works constant.

For example, the Publication of Unexamined Japanese Patent Application No. JP-A-11-183005 disclosed a brine supply device consisting of a primary circuit that adjusts the brine temperature to a specified temperature, a secondary circuit that adjusts the brine temperature supplied to the works to a target temperature, and a valve that adjusts the flow rate of the brine that flows in from the primary circuit to be mixed with the flow of the secondary circuit. In this device, the valve opens when the work temperature rises above the preset temperature and causes the cooler brine from the prime circuit to be mixed at a predetermined flow rate with the secondary circuit brine. This lowers the temperature of the brine being supplied to the works to the preset temperature.

The PID control and the cascade control that combines two PID controls are the two most widely used control methods for controlling the above-mentioned valve in order to achieve the temperature control. In order to achieve a good control result by the PID control, it is necessary to tune P (proportional band), I (integral time), and D (differential time) constants to their optimum values. The PID constants are determined by means of a trial-and-error method while making a trial run of the device.

In the control of the valve operation, the variation $\Delta MV$ of the manipulated variable MV obtained by PID calculations and the variation $\Delta PV$ of the temperature are not proportional to each other. Therefore, a good control result is not obtainable by applying only one set of the PID constants within the temperature range to be controlled. Therefore, the temperature range to be controlled is divided into multiple segments and PID constants are determined for each temperature range segment. The problem here is that the tuning process becomes more complex and requires a longer time to complete as multiple sets of PID constants have to be determined.

In a process such as the one found in a semiconductor manufacturing system, a large heat load can be supplied to the work within a short time interval from an external heat source provided on said process side, or abruptly taken away. It is a system's requirement to maintain the work temperature at the predetermined temperature at all times despite these heat load variations from the external heat source.

In case of feedback control systems such as the PID control system, the work temperature change according to the heat quantity variation is small if the change of heat load applied to the work is small, so that the work temperature can be maintained at the predetermined temperature with a sufficient accuracy.

However, in a feedback control system it is impossible to make the brine supply temperature change quick enough to follow the work temperature change if a large heat load change is made within a short period of time, which causes a hunting and instability of the control system in adjusting the work temperature to the predetermined temperature.

SUMMARY OF THE INVENTION

The present invention was made under the circumstances described above and its objective is to provide a temperature control device that can accurately control temperatures using only one set of PID constants.

The other objective is to offer a work temperature control device with an improved stability in adjusting the load to a predetermined temperature minimizing the probability of causing load temperature hunting phenomena.

The abovementioned object of this invention can be achieved with the following means.

The present invention is a temperature control device characterized by comprising:

a primary circuit for adjusting the temperature of a first heating medium to a predetermined temperature;

a secondary circuit for adjusting the temperature of a second heating medium, which is to be supplied to a load, to a target temperature (SV(S));

a valve for adjusting the flow rate of the first heating medium, which is to be mixed with the second heating medium or conducts a heat exchange with the second heating medium;

a supply temperature detection unit for detecting the current supply temperature (Pt1) of the second heating medium;

a PID arithmetic unit for calculating the manipulated variable (MV) of said valve based on the target temperature (SV(S)) of the second heating medium, the current supply temperature (Pt1) of the second heating medium, and a predetermined set of PID constants;

a compensating arithmetic unit for calculating a compensated manipulated variable (MV') by compensating the manipulated variable (MV) calculated by said PID arithmetic unit; and a control unit for controlling the operation of said valve based on the compensated manipulated variable (MV'); wherein the variation ($\Delta MV$) of the manipulated variable (MV) is made proportional to the variation ($\Delta PV$) of the current supply temperature (Pt1) of the second heating medium by means of controlling the operation of said valve based on the compensated manipulated variable (MV').

The compensating factor k ($0 \leq k \leq 1$), by which the manipulated variable (MV) is multiplied at the compensation arithmetic unit, is defined as follows:

$$k = 1 - (Pt1 - PV1)(1-n)/(PV2 - PV1)$$

where,

PV1: lower limit of the operating temperature of the second heating medium;

PV2: upper limit of the operating temperature of the second heating medium;

Pt1: current supply temperature of the second heating medium; and n: a constant for limiting the manipulated variable when the second heating medium supply temperature is equal to the upper limit PV2.

According to the temperature control unit described above, the supply temperature of the second heating medium can be adjusted to a desired temperature by means of only one set of PID constants for a wide temperature range from the lower limit to the upper limit of the operating temperature of the second heating medium. Consequently, it becomes possible to adjust the load to a predetermined temperature by means of only one set of PID constants. Since it is required to determine only one set of PID constants, the determination process can be easily performed and the user can easily change the setup temperature of the load.

The present invention is a temperature control device that maintains the temperature of the load to a setup temperature (SV(R)), while the heat load added thereto by an external heat source is changed, comprising:

a supply temperature detection unit for detecting the current supply temperature (Pt1) of a heating medium supplied to the load;

a load temperature detection unit for detecting the current temperature (Pt2) of the load;

an adjusting unit for adjusting the supply temperature (Pt1) of the heating medium;

an acquiring unit for acquiring in advance a first temperature change curve (L1) of the load when said heat load is changed while maintaining the supply temperature (Pt1) of the heating medium constant;

a first calculating unit for calculating an imaginary second temperature change curve (L2) of a load (W), which is in axial symmetry with said first temperature change curve (L1), based on the setup temperature (SV(R)) of the load;

a second calculating unit for calculating a target temperature change curve (L3) of the heating medium for realizing said second temperature change curve (L2); and a control unit for controlling said adjusting unit so that the supply temperature (Pt1) of the heating medium changes according to said target temperature change curve (L3) when the heat load applied to the load by said external heat source is changed.

According to the temperature control unit described above, since the supply temperature of the heating medium is adjusted predictively before a temperature change occurs in the load due to the heat load change, the difference between the load temperature and the setup temperature does not grow as large as in feedback controls such as the PID control. Consequently, the load temperature can be maintained constant with a smaller hunting compared to the feedback control even when a large heat load change occurs in a short period of time, thus making it possible to achieve a higher control stability in adjusting the load to a setup temperature.

Other objects, features and characteristics of the invention will become apparent with reference to following descriptions and preferred embodiments exemplified in the accompanying drawings.

BRIEF DESCRIPTION OF THE DRAWINGS

FIG. 7 is a constitutional diagram showing a variation for detecting the current temperature of the load by measuring the temperature of the brine returning from the load;

DETAILED DESCRIPTION OF THE PREFERRED EMBODIMENTS

The temperature control device according to the present invention will be described in detail according to preferred embodiments shown in the accompanying drawings.

Embodiment 1

Figure 1:
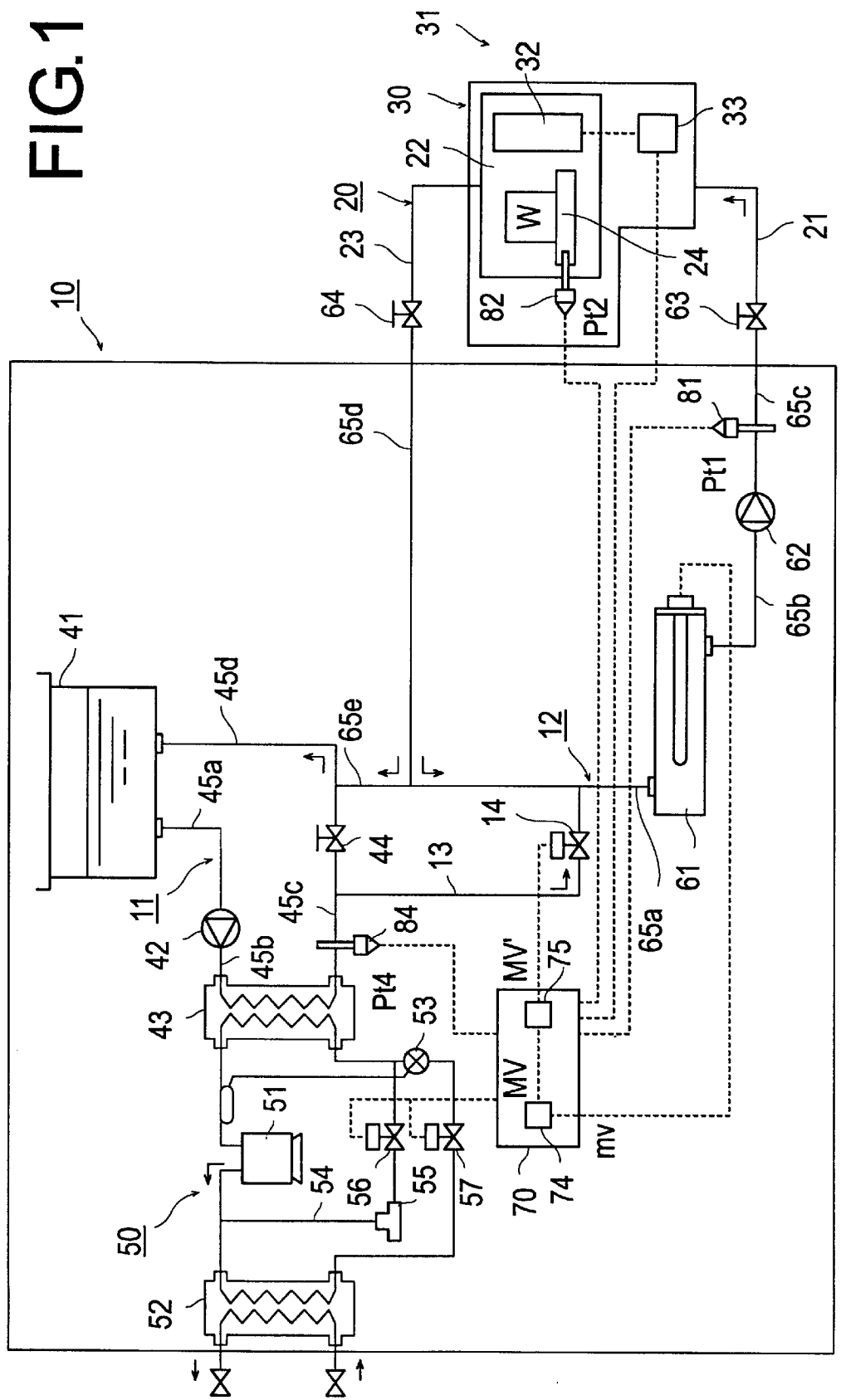
FIG. 1 is the first embodiment of the brine supply device to which the temperature control device of the invention is applied.

The first embodiment of the brine supply device as a temperature control device will be described below referring to FIG. 1.

The brine supply device 10 is connected to a load circuit 20 where a work W is disposed as a load. The brine supply device 10 includes: a primary circuit 11 for adjusting the temperature of brine (first heating medium); a secondary circuit 12 for adjusting the brine (second heating medium) supplied to the work W to a target temperature; a connecting line 13 to connect the primary circuit 11 and the secondary circuit 12, and a valve 14 provided in a connecting line 13. Brine of a relatively low temperature circulates in the primary circuit 11 and brine of a relatively high temperature circulates in the secondary circuit 12. A portion of the brine in the primary circuit 11 mixes with the brine in the secondary circuit 12 through the connecting line 13. The flow rate of the brine from the primary circuit 11 to be mixed with the brine in the secondary circuit 12 is adjusted by the opening/closing operations of the valve 14 to control the supply temperature of the brine to be supplied to the work W. The temperature of the work W is adjusted by the temperature controlled brine. The controller 70 controls the operation of the brine supply device 10. The brine to be used here can be, e.g., fluorine based brine, cold water, pure water, refrigerant, etc., and a brine suitable for the work W will be selected.

More specifically, the primary circuit 11 includes a brine tank 41 for storing the brine, a first pump 42 for circulating the brine, a heat exchanger 43, and a valve 44. These circuit elements are connected by means of pipes 45a through 45d. The brine tank 41 is sealed with a cap so that it is not communicating with the atmosphere, but it is not a pressure vessel to be controlled by the regulation, i.e., it is constructed as a semi-sealed vessel. Since the purpose of the first pump 42 is to circulate the brine through the primary circuit 11, its disposition does not necessarily have to be between the brine tank 41 and the heat exchanger 43. For example, it can be provided in line with the pipe 45c on the outlet side of the heat exchanger 43. The brine is cooled by exchanging heat with a coolant supplied to the heat exchanger 43. A fourth temperature sensor 84 to detect the cooled brine's temperature Pt4 is provide on the pipe 45c on the outlet side of the heat exchanger 43. The setup temperature of the work W in the first embodiment is relatively low (for example, 40° C. through 60° C.) and a refrigerant is used as a coolant. The coolant is cooled by a refrigerator 50.

The refrigeration cycle of the refrigerator 50 includes a compressor 51 for compressing the refrigerant, a condenser 52, through which cooling water runs, an expansion valve 53, and a heat exchanger 43 that serves as an evaporator. The brine temperature Pt4 is adjusted by adjusting the temperature of the refrigerant that flows into the heat exchanger 43. The temperature of the refrigerant is controlled by controlling the refrigerating capacity of the refrigerator 50. The capacity control for the refrigerator 50 is conducted by controlling the hot gas flow rate. The refrigerator 50 has a hot gas bypass pipe 54 that connects the outlet side of the compressor 51 and the outlet side of the expansion valve 53, a capacity regulating valve 55 and a first solenoid valve 56 provided in line with a hot gas bypass pipe 54, and a second solenoid valve 57 provided in line with a pipe extending from the outlet of the condenser 52 to the expansion valve 53. Each of the first and the second solenoid valves 56 and 57 is open when the other is closed and closed when the other is open. When the first solenoid valve 56 is opened, the relatively high temperature gaseous refrigerant compressed by the compressor 51 will pass through the capacity regulating valve 55 and the hot gas bypass pipe 54, and will mix with the refrigerant that is relatively cooled due to adiabatic expansion by the expansion valve 53. The flow rate of the hot gas flowing toward the output side of the expansion valve 53 will be determined by the setup value of the capacity regulating valve 55 and the opening time of the first solenoid valve 56. As a result of the opening/closing actions of the first and second solenoid valves 56 and 57, the temperature of the refrigerant that flows into the heat exchanger 43 will be adjusted and the brine cooled by the heat exchanger 43 will be adjusted to a predetermined temperature as a result. The controller 70 controls the first and the second solenoid valves 56 and 57 in order to make the brine temperature Pt4 will be lower than the brine target temperature SV(S) that is supplied to the work W by a predetermined temperature (e.g., 8° C.).

The coolant that cools the brine can be arbitrarily selected according to the setup temperature of the work W. For example, if the setup temperature of the work W is relatively higher, cold water can be used as the coolant.

The secondary circuit 12 includes an electric heater (corresponds to a heating unit) 61 that heats the brine, a second pump 62 for circulating the brine, a supply port 63 that supplies the brine to the load circuit 20, and a return port 64, through which the brine which has passed the load circuit 20. These circuit elements are connected by means of pipes 65a through 65d. The secondary circuit 12 is connected to the brine tank 41 via a pipe 65e that branches off from the pipe 65d. Brine of an amount equivalent to the amount mixed into the secondary circuit 12 from the primary circuit 11 through the valve 14 is returned to the brine tank 41 through the piping 65e. Brine will be heated by the electric heater 61 and the temperature of the work W can be quickly raised to a desired temperature. The heating unit used here is not limited to the electric heater 61 but can be any device as long as it has a capability to heat brine. Also, since the primary purpose of the second pump 62 is to circulate brine in the secondary circuit 12, its location is not limited only to the position for sending out the brine heated by the heater 61 as indicated in the drawing. For example, it can be located on the pipe 65a at the entrance side of the heater 61. This brine supply device 10 is formed in such a way that it does not change the brine flow rate while it is being operated. Therefore, a pump capable of discharging brine at a fixed flow rate is used as the second pump 62. However, a pump with a selectable brine flow rate setting can be used to meet various specifications required for the brine supply device 10.

The connecting line 13 is provided between the pipe 45c and the pipe 65a. The valve 14 provided in the connecting line 13 is a solenoid valve that turns on and off the communication between the primary circuit 11 and the secondary circuit 12. In order to lower the brine temperature that supplied brine to the work W, the valve 14 opens to allow a portion of the brine that circulates through the primary circuit 11 to be introduced to the inlet side of the heater 61 through the connecting line 13.

In the format that introduces a portion of the brine in the primary circuit 11 to the secondary circuit 12 as needed, it is not necessary to cool the entire amount of brine existing in the brine supply device 10 and the brine in the secondary circuit 12 will be cooled no more than necessary. As a result, the energy loss in reheating by the heater 61 can be held to a minimum thus contributing to a more efficient operation of the brine supply device 10. As the brine temperature Pt4 of the primary circuit 11 is adjusted lower than the brine target temperature SV(S), it is possible to lower the temperature of the work W quickly by lowering the brine supply temperature Pt1 even when the temperature increase of the work W is large.

The load circuit 20 is typically built into a manufacturing device, an inspection device or an isothermal device. For example, the load circuit 20 is built into a film forming device 30, which is used to form thin films on glass substrates used for LCD panels. In this case, the glass substrate is the work W.

The load circuit 20 includes an input pipe 21 that connects to the supply port 63, a chamber 22 that contains the work W, and an outlet pipe 23 that connects to the return port 64. The work W is mounted on the plate 24. The plate 24 is heated/cooled by the brine supplied to the chamber 22 to adjust the work temperature to the setup temperature.

The load circuit 20 is further provided with an external heat source 31 on the process side that adds a heat load to the work W. The external heat source 31 consists of an electric heater 32, to which a specified current of a specified voltage is applied from the power source 33. Joule Heat generated by the electric heater 32 is applied to the work W to raise the temperature. "The external heat source 31" is the general name given to various devices that heat the work W and does not mean only an electric heater.

The pipe 65c is provided with a first temperature sensor 81 to detect the current supply temperature Pt1 of the brine being supplied to the load W. The load circuit 20 is provided with a second temperature sensor 82 to detect the current temperature Pt2 of the work W. The first temperature sensor 81 corresponds to the supply temperature detection unit and the second temperature sensor 82 corresponds to the load temperature detection unit. The temperature sensors 81, 82 and 84 consist of resistance thermometers, thermocouples, etc. Since the temperature of the plate 24 is approximately equal to the work temperature Pt2, the work temperature Pt2 is indirectly measured by measuring the plate temperature in the case shown in the figure.

Figure 2:
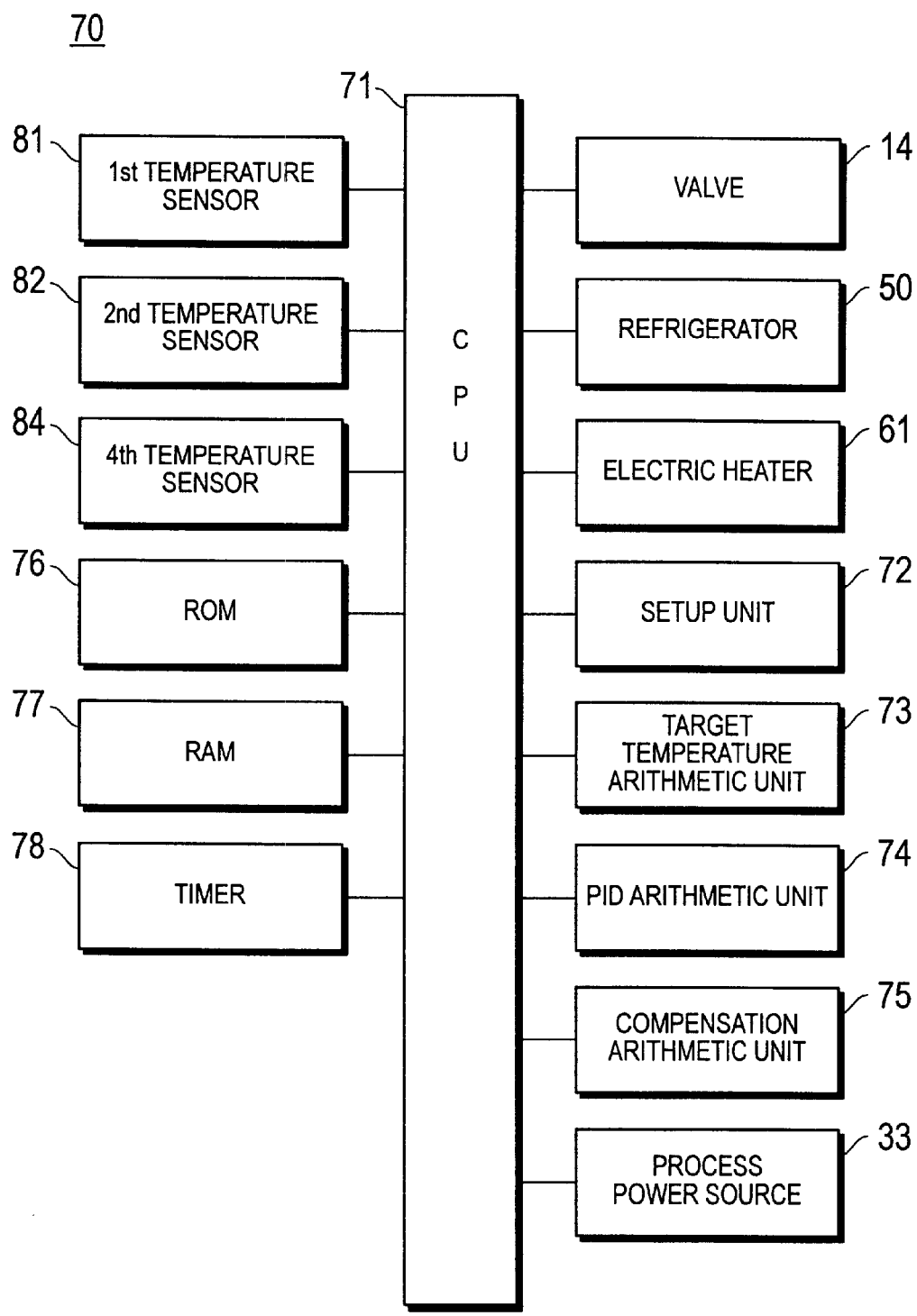
FIG. 2 is a block diagram showing a controller that controls the operation of the brine supply device.

The constitution of the controller 70 that controls the operation of the brine supply device 10 will be described below in reference to FIG. 2.

The sensors 81, 82, and 84 are connected to a CPU 71, i.e., the control unit, to feed the detection signals of the brine supply temperature Pt1, the work temperature Pt2, and the brine temperature Pt4 of the primary circuit 11. The CPU 71 is further connected with a setup unit 72, a target temperature arithmetic unit 73, a PID arithmetic unit 74, a compensation arithmetic unit 75, a ROM 76, a RAM 77 and a timer 78. The setup unit 72 consists of an input device such as a digital keypad and is used for setting up the setup temperature SV(R) of the work W. The target temperature arithmetic unit 73 calculates the target temperature SV(S) of the brine to be supplied to the work W based on the work setup temperature SV(R), the work temperature Pt2, and the brine supply temperature Pt1. The PID arithmetic unit 74 conducts a PID calculation of the manipulated variable MV for the valve 14 based on the brine target temperature SV(S), the brine supply temperature Pt1, and a predetermined set of PID constants (P, I and D). The PID arithmetic unit 74 also conducts a PID calculation of the manipulated variable mv for the electric heater 61 based on the PID constants for the electric heater 61. The compensation arithmetic unit 75 calculates the compensated manipulated variable MV' by compensating the manipulated variable MV calculated by the PID arithmetic unit 74. The CPU 71 outputs the compensated manipulated variable MV' to the valve 14 to control the operation of the valve 14. The CPU 71 munipulated variable mv to switching elements including those of the SSR (solid state relay) of the electric heater 61 to control the operation of the electric heater 61. The CPU 71 outputs control signals to the first and second solenoids 56 and 57 for the capacity control of the refrigerator 50. The ROM 76 stores various parameters and programs necessary for controlling the operation of the brine supply device 10 in addition to various formulae related to the compensation factor to be multiplied to the manipulated variable MV. The RAM 77 stores the PID constants necessary for the PID calculation and others.

The CPU 71 is also connected with a power source 33 of the process side and receives the on/off signals corresponding to the power supply from the power source 33 to the electric heater 32 and the output value signal concerning the power supplied to the heater 32.

The PID constants are obtained by a simulation based on the performance characteristics of the brine supply device 10 and the specifications of the film forming device 30. When the brine supply device 10 is shipped from the plant, it will be set up with the PID constants as obtained in the above. However, it is impossible to accurately simulate the entire dynamic characteristics of the brined supply device 10 and the film forming device 30. Thus, the final PID constants are determined by a trial-and-error method during the overall test run of the brine supply device 10 and the film forming device 30. The determined PID constants are stored in the RAM 77.

Figure 3:
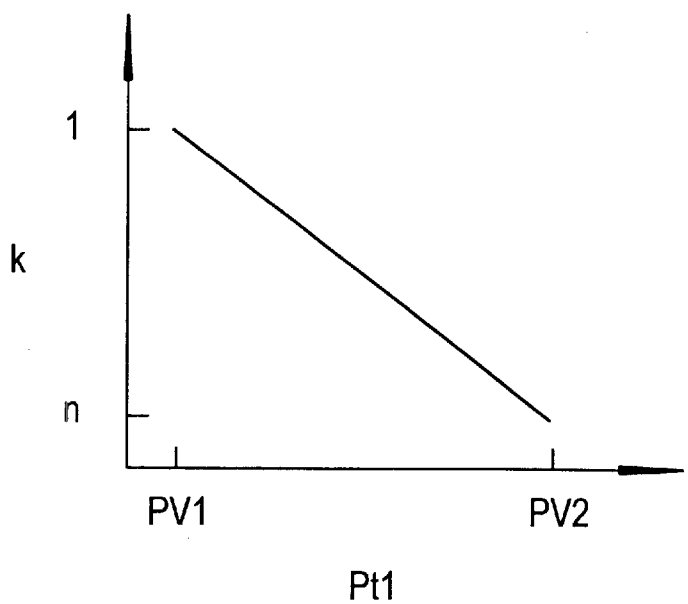
FIG. 3 is a graph showing a compensating factor k ($0 \leq k \leq 1$) that is multiplied to the manipulated variable MV of a solenoid valve and the brine supply temperature Pt1.

The compensation factor k will be described below with reference to FIG. 3.

As shown in the figure, the compensation factor k is inverse proportional to the brine supply temperature Pt1. The compensation factor k is defined as follows:

$$k=1-(Pt1-PV1)(1-n)/(PV2-PV1)$$

where,

PV1: lower limit of the operating temperature of the brine;

PV2: upper limit of the operating temperature of the brine;

Pt1: current supply temperature of the brine; and n: a constant for limiting the manipulated variable MV when the brine supply temperature is equal to the upper limit PV2.

The lower limit PV1 is determined from the lower limit temperature of the work W, while the upper limit PV2 is determined from the upper limit temperature of the work W. The lower and upper limits of the work W are part of the specifications of the film forming device 30. The system must be able to control the work temperature within the temperature range determined by the lower and upper limits of the work W. Therefore, the cooling capacity of the refrigerator 50 is determined based on the brine circulating flow rate, the lower limit temperature of the work W, the heat generated by the load circuit 20, etc., and the heating capability of the electric heater 61 is determined by the brine circulating flow rate, the upper limit temperature of the work W, etc.

When the brine supply temperature Pt1 is equal to the lower limit PV1 (Pt1=PV1), the compensation factor k is set to "1," and the manipulated variable MV of the valve 14 obtained by the PID calculation is equal to the compensated manipulated variable MV'. On the other hand, when the brine supply temperature Pt1 is equal to the upper limit PV2 (Pt1=PV2), the compensation factor k is set to "n," as k=1−(1−n). This "n" is a value to limit the opening operation time of the valve 14 when the brine supply temperature Pt1 is equal to the upper limit PV2.

The process of determining the "n" value will be described below using a numerical example. For the sake of the simplicity of description, let us replace brine with water. Let us also assume that the lower limit PV1 is 10° C. and the upper limit PV2 is 90° C. Let us also assume that the water temperature Pt4 of the primary circuit 11 is fixed at 0° C. and the cooling capability of the refrigerator 50 is 1500 kcal/hr. Let us also assume that the heat generated by the load circuit 20 is 1500 kcal/hr, and the flow rate of the water supplied to the work W by the second pump 62 is 10 liter/minute. Let us also assume that the flow rate of the water that is mixed into the secondary circuit 12 through valve 14 is x liter/minute, the flow rate of the water returning to the tank 41 from the pipe 65*d* through the pipe 65*e* to the tank 41 is x liter/minute, and the flow rate of the water returning from the pipe 65*d* to the pipe 65*a* is y (=10−x) liter/minute.

The temperature rise in the water that has passed the work W is: 1500[kcal/hr]/(60[min/hr]×10[liter/min]×1[kcal/(liter·° C.)])=2.5[° C.].

When the operating water temperature is equal to the lower limit PV1, i.e., 10° C., the flow rate x of the 0° C. water that required to make the water temperature to 10° C. is calculated from the relation: x[liter/min]×0[° C.]+y [liter/min]×(10+2.5)[° C.]=10[liter/min]×10[° C.], as x=2[liter/min].

The PID constants (P, I and D) for the valve 14 are determined based on the lower limit PV1 of the brine operating temperature. More specifically, the PID constants of the valve 14 are determined in such a way that the manipulated variable MV of the valve 14 becomes 100% (fully opened) when the brine operating temperature is equal to the lower limit PV1 and that the refrigerator 50 operates at the rated capacity. In the above numerical example, the valve 14 becomes fully open as 100% manipulated variable MV is applied when the water operating temperature is at the lower limit, i.e., 10° C. The specifications of the connecting line 13 and the valve 14 (e.g., diameter) are determined in such a way that the water flows at a rate of 2 liter/minute.

On the other hand, if the water operating temperature is 90° C., i.e., the upper limit PV2, the flow rate x of the 0° C. water required to make the water temperature to 90° C. is calculated from the relation: x[liter/min]×0[° C.]+y [liter/min]×(90+2.5)[° C.]=10[liter/min]×90[° C.], as x=0.27[liter/min].

If the manipulated variable MV of the valve 14 is calculated as 0.27[liter/min]×100[%]/2[liter/min]=13.5[%], the above flow rate can be realized. More specifically, the above flow rate can be realized by using the proportional band P of 1/0.135=7.4 times of the value of the proportional band P when the operating temperature of water is equal to the lower limit PV1.

However, as a result of using a set of PID constants, which is determined when the assumption that the water operating temperature is 10° C., the manipulated variable MV when the water temperature is 90° C. is not 13.5% but rather 100%. This makes it impossible to control the water temperature to be supplied to the work W to the target temperature of 90° C. because the flow rate of the 0° C. water is too much. As a result, the heating by the electric heater 61 increases and waste of energy occurs. Moreover, since a lot of water at 92.5° C. returns to the tank 41, overloading of the compressor 51 of the refrigerator 50 results.

Therefore, in order to limit the manipulated variable MV when the supply temperature Pt1 is equal to the upper limit PV2, "n" is set to 0.27[liter/min]/2[liter/min]=0.135.

Once the "n" value is set like this, the temperature following control is executed. When the supply temperature Pt1 is equal to 10° C., i.e., the lower limit PV1 (Pt1 =PV1), the compensation factor k=1−(Pt1−PV1)(1−0.135)/(PV2−PV1)=1. As a result, if the manipulated variable MV is calculated to be 100%, the compensated manipulated variable MV' actually applied to the valve 14 is also 100[%]× k=100[%], 2 liter/minute of water flows through the valve 14, and the water temperature will be controlled to 10° C. The refrigerator 50 also operates at the rated capacity of 1500 kcal/hr.

When the supply temperature Pt1 is 90° C., i.e., the upper limit PV2 (Pt1=PV2), the compensation factor k=1−(Pt1−PV1)(1−0.135)/(PV2−PV1)=0.135. As a result, even if the manipulated variable MV is calculated to be 100%, the compensated manipulated variable MV' actually applied to the valve 14 is also 100[%]×k=13.5[%], so that 0.27 liter/minute of water flows through the valve 14, and the water temperature will be controlled to 90° C. The refrigerator 50 does not cause overloading in this case and operates at the rated capacity of 1500 kcal/hr.

As can be seen from the above, by controlling the valve 14 at the compensated manipulated variable MV' obtained by multiplying the manipulated variable MV with the compensating factor k, the variation ΔMV of the manipulated variable MV becomes proportional to the variation ΔPV of the supply water temperature Pt1. In other words, the supply water temperature Pt1 can be adjusted to a desired temperature within the range of 10° C. through 90° C. using only one set of PID constants. Moreover, when the manipulated variable MV is 100%, the refrigeration capacity of the refrigerator 50 is constantly 1500 kcal/hr regardless of the water temperature as long as it is within the range of 10° C. through 90° C. Therefore, it provides an effect of preventing the overload of the refrigerator 50.

In the first embodiment, the controller 70 controls the operation of the valve 14 with the compensated manipulated variable MV' obtained by multiplying the manipulated variable MV based on the PID calculation with the compensation factor k. This control makes the variation ΔMV of the manipulated variable MV proportional to the variation ΔPV of the brine supply temperature Pt1. This means that the brine supply temperature Pt1 can be adjusted to any desired temperature using only one set of PID constants within a range from the lower limit PV1 to the upper limit PV2 of the brine operating temperature.

The reason the manipulated variable mv of the electric heater 61 is not compensated is that the variation Δmv of the manipulated variable mv is approximately proportional to the variation of the brine temperature that passed the electric heater 61 regardless of the temperatures. Of course, the operation of the electric heater 61 can also be controlled, similar to the case of the valve 14, by the compensated manipulated variable obtained by multiplying the manipulated variable mv with the compensating factor.

If the constant-value control, in which the target temperature of brine is constant, is applied, there will be many cases in this embodiment where the time constant exceeds one hour depending on the work W, so that it will be impractical to use. In a system with such a large time constant, the cascade control is normally used. The cascade control is a kind of the follow-up value control where the target value changes with time.

The cascade control needs two adjusters, i.e., a first temperature adjuster that uses the work temperature as the setup value, and a second temperature adjuster that controls the brine supply temperature. The setup value of the first temperature adjuster is fixed. The first temperature adjuster conducts a PID calculation based on the deviation between the fixed setup value and the work temperature and outputs the manipulated value. On the other hand, the second temperature adjuster receives the manipulated variable outputted from the first temperature adjuster as the input, conducts a PID calculation on it, and outputs the result as the manipulated variable. As can be seen from the above, the cascade control is essentially a method based on a PID calculation by means of two temperature adjusters so that it cannot control the brine supply temperature accurately by simply setting up only one set of PID constants. Therefore, it is necessary to divide the brine usage temperature range into, e.g., eight segments and determine PID constants for each temperature adjuster for each segment of temperature range. Moreover, the PID constants of each temperature adjuster have to be changed according to the work setup temperature.

However, the user cannot change the PID constants easily. Therefore, it is impractical to adopt the cascade control on a brine supply device where heating and cooling are applied repeatedly on the work W and the setting temperature has to be changed substantially and frequently. Moreover, since the final PID constants need to be determined by a trial-and-error method, the process of determining the constants become more complicated and time consuming as the number of sets of PID constants is increased to improve the accuracy of the temperature control.

On the contrary, the brine supply device 10 of this embodiment covers the temperature range from the lower limit PV1 to the upper limit PV2 of the operating brine temperature with only one set of PID constants as mentioned above. Therefore, it is a preferable control for cases in which the setting temperatures of the work W vary substantially and frequently. Since only one set of PID constants is required to be determined, the determining process can be done relatively easily and quickly.

Figure 6:
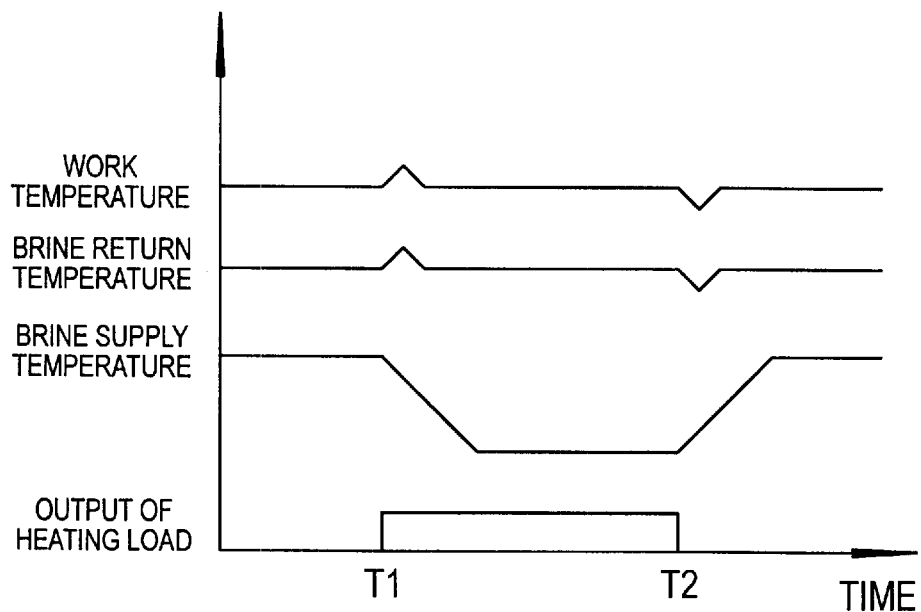
FIG. 6 is a chart conceptually showing an example of temperature change in the first embodiment.
Figure 4:
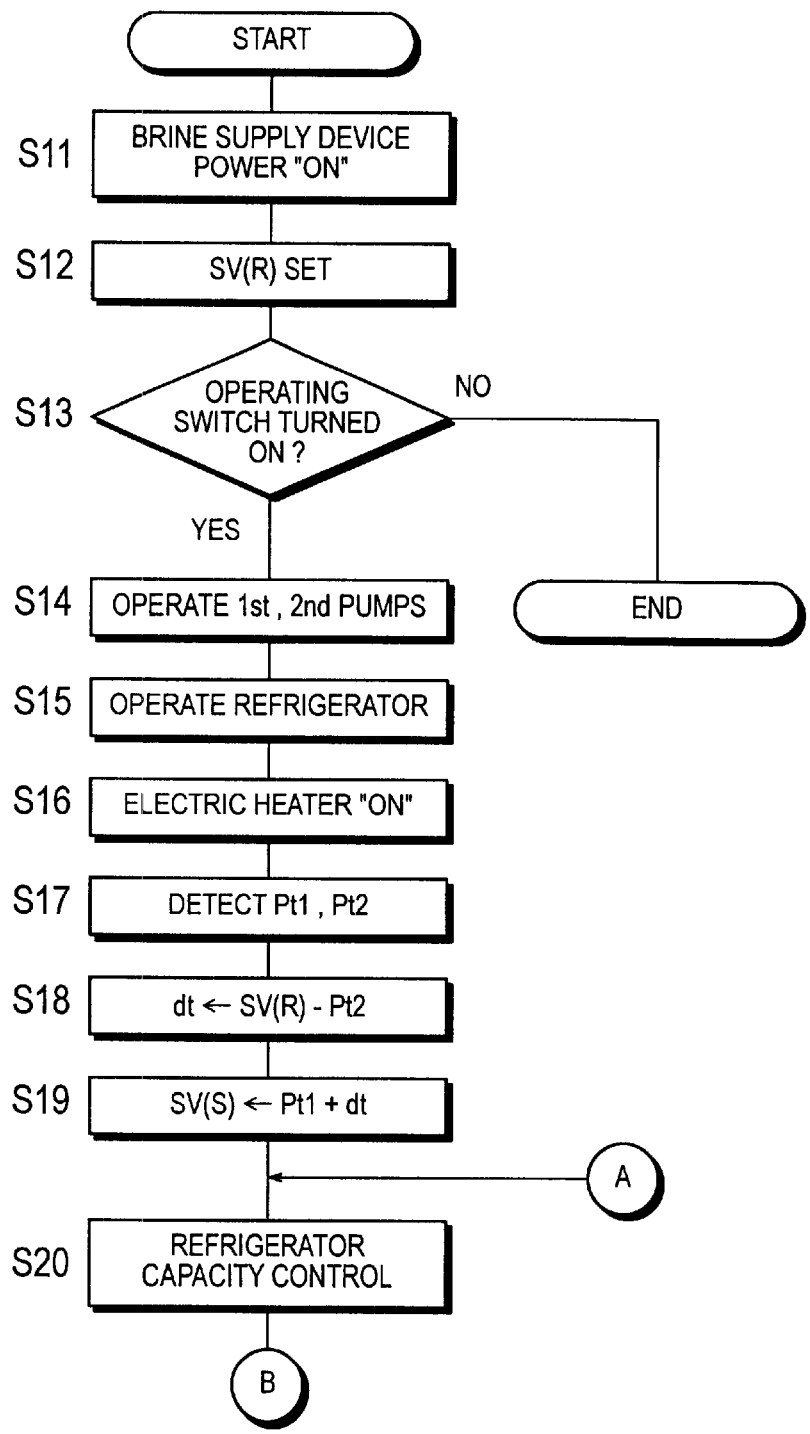
FIG. 4 and FIG. 5 constitute a flow chart describing the operation of the first embodiment.

The operation of the first embodiment will now be described referring to FIG. 4 and FIG. 5 that show the flow chart as well as FIG. 6.

When the power to the brine supply device 10 is turned on (S11), the controller 70 becomes ready to accept the user's input of the work setup temperature SV(R) (S12). When the work setup temperature SV(R) is set and the start switch is depressed (S13: YES), the first and second pumps 42 and 62 start to run (S14). Brine runs through the primary circuit 11 and secondary circuit 12 at a constant flow rate with the help of the pumps 42 and 62. The controller 70 also turns on a motor to run the compressor 51 and thus the refrigerator 50 (S15), and turns on the electric heater 61 (S16).

The first temperature sensor 81 detects the brine supply temperature Pt1 and the second temperature sensor 82 detects the work temperature Pt2 (S17).

The controller 70 calculates the deviation between the work setup temperature SV(R) and the work temperature Pt2, i.e., dt=SV(R)−Pt2 (S18). The controller 70 determines the initial value of the brine target temperature SV(S) based on a formula SV(S)=Pt1+dt=Pt1+(SV(R)−Pt2)(S19).

The controller 70 turns the first and second valves 56 and 57 on and off to control the hot gas flow in order to control the capacity of the refrigerator 50 (S20). The brine temperature Pt4 at the outlet of the heat exchanger 43 is adjusted to a temperature lower than the brine target temperature SV(S) by a specified margin (e.g., 8° C.).

Figure 5:
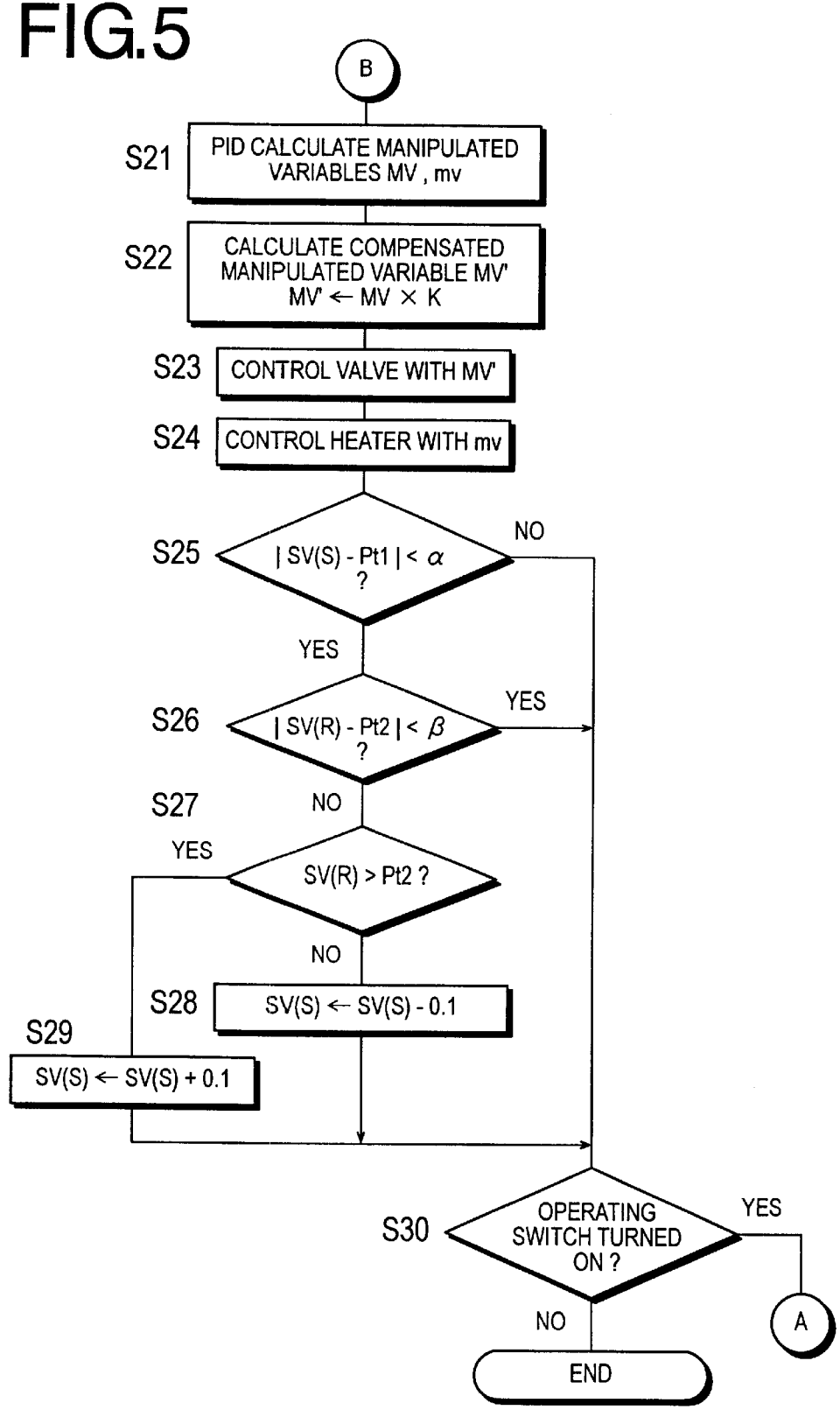

The controller 70 conducts a PID calculation on the manipulated variable MV of the valve 14 based on the brine target temperature SV(S), the brine supply temperature Pt1, and one set of PID constants for the valve 14 (S21 shown in FIG. 5). The controller 70 also conducts a PID calculation on the manipulated variable mv of the electric heater 61 based on the PID constants for the electric heater 61 (S21).

The controller 70 calculates the compensated manipulated variable MV' multiplying the manipulated variable MV of the valve 14 with the compensation factor k (S22). The compensated manipulated variable MV' thus obtained is outputted to the valve 14 to control the valve 14 on and off (S23). The controller 70 does not compensate the manipulated variable mv of the electric heater 61. The manipulated variable mv is outputted to the electric heater 61 to control the operation of the electric heater 61 (S24).

Next, the controller 70 makes a judgment whether the brine supply temperature Pt1 has reached the brine target temperature SV(S) (S25). More specifically, it makes a judgment whether the absolute value of SV(S)−Pt1 is less than the error tolerance α. The tolerance α is, for example, 0.1 to 0.2° C.

If it has not reached the brine target temperature (S25: NO), the controller 70 makes a judgment whether the brine supply device 10 is still operating (S30). If it is still operating (S30: YES), the steps S20 through S25 will be repeated; if it is not operating anymore (S30: NO), the process will be terminated.

When the brine supply temperature Pt1 has adjusted to the brine target temperature SV(S) (S25: YES), the controller 70 makes a judgment whether the work temperature Pt2 has reached the work setup temperature SV(R) (S26). More specifically, it makes a judgment whether the absolute value of SV(R)−Pt2 is less than the error tolerance β. The tolerance β is, for example, 0.1 to 0.2° C.

If it has reached the work setup temperature (S26: YES), the controller 70 makes a judgment whether the brine supply device 10 is still operating (S30) while maintaining the current brine target temperature SV(S). If it is still operating (S30: YES), the steps S20 through S26 will be repeated; if it is not operating anymore (S30: NO), the process will be terminated.

When the work temperature Pt2 has not adjusted to the work setup temperature SV(R) (S26: NO), the controller 70 makes a judgment whether the work temperature Pt2 is lower than the work setup temperature SV(R) (S27).

If the work temperature Pt2 is higher than the work setup temperature SV(R) (S27: NO), the brine target temperature SV(S) is rest 0.1° C. lower (S28). On the other hand, if the work temperature Pt2 is lower than the work setup temperature SV(R) (S27: YES), the brine target temperature SV(S) is reset 0.1° C. higher. The process advances to the step S30, and if the brine supply device 10 is still operating (S30: YES), the steps S20 through S29 will be repeated; if it is not operating any more (S30: NO), the process will be terminated.

According to this first embodiment, the heat exchange quantity between brine and the work W does not change abruptly as the work temperature is controlled by means of the temperature information alone without changing the brine circulation amount. Thus, it seldom causes hunting phenomena in the work temperature, consequently improving the control stability in adjusting the work W to the setup temperature. For example, the temperature of the work W can be controlled to such a high accuracy of ±0.5° C.

Moreover, the valve 14 is on/off controlled by means of the compensated manipulated variable MV' obtained by multiplying the manipulated variable MV, which is obtained by a PID calculation, with the compensation coefficient k. As a result of this control, the variation ΔMV of the manipulated variable MV is proportional to the variation ΔPV of the brine supply temperature Pt1. Therefore, it is possible to adjust the brine supply temperature Pt1 to a desired temperature within a broad range from the lower limit PV1 to the upper limit PV2 of the brine operating temperature using only one set of PID constants. As a result, the work W can be adjusted to a desired temperature using only one set of PID constants. Since it requires only one set of PID constants, the process of determination is quite simple. Also, the user can change the setting temperature of the work W easily.

Modified Example

As the brine of the primary circuit 11 is mixed with the brine in the secondary circuit 12 via the valve 14 in the embodiment described above, the first heating medium is the same substance as the second medium. The invention is not limited to such a case, however, and it can be applied to a case where an adjustment is made by means of the valve 14 on the flow rate of the first heating medium that exchanges heat with the second heating medium. In such a case, a heat exchanger is provided for exchanging heat between the first heating medium and the second heating medium, and the first heating medium can be a different substance from the second heating medium.

Although an embodiment is described above where the invention is applied to a follow-up value control where the target temperature SV(S) of the second heating medium changes with time, the invention can be applied to a constant-value control where the target temperature SV(S) of the second heating medium stays constant. It is possible in this case also to adjust the supply temperature of the second heating medium to a desired temperature within a broad range from the lower limit PV1 to the upper limit PV2 of the second heating medium using only one set of PID constants.

While the work temperature Pt2 is detected by measuring the temperature of the plate 24, on which the work W is mounted, by means of the second temperature sensor 82, the detection of the current temperature of the work W is not limited to such a case. As shown in FIG. 6, there is a certain correlation between the current temperature of the work W and the temperature of the brine returning from the load circuit 20. Therefore, as the brine supply device 10A shown in FIG. 7, the current temperature of the work W can be indirectly determined from the return brine temperature Pt3 by providing a third temperature sensor 83 in the return pipe 65*d* and measuring the temperature Pt3 of the brine returning from the load circuit 20. It is also possible to make the second temperature sensor 82 contact directly with the work W and directly measure the current temperature of the work W. Moreover, it is possible to determine the current temperature of the work W by measuring the temperature of the brine that comes in contact with the work W.

Although the valve 14 was indicated as a solenoid valve, an on/off valve, to control the flow rate of the first heating medium to zero or maximum, the valve 14 can be a flow control valve that controls the flow rate of the first heating medium continuously.

Second Embodiment

Figure 8:
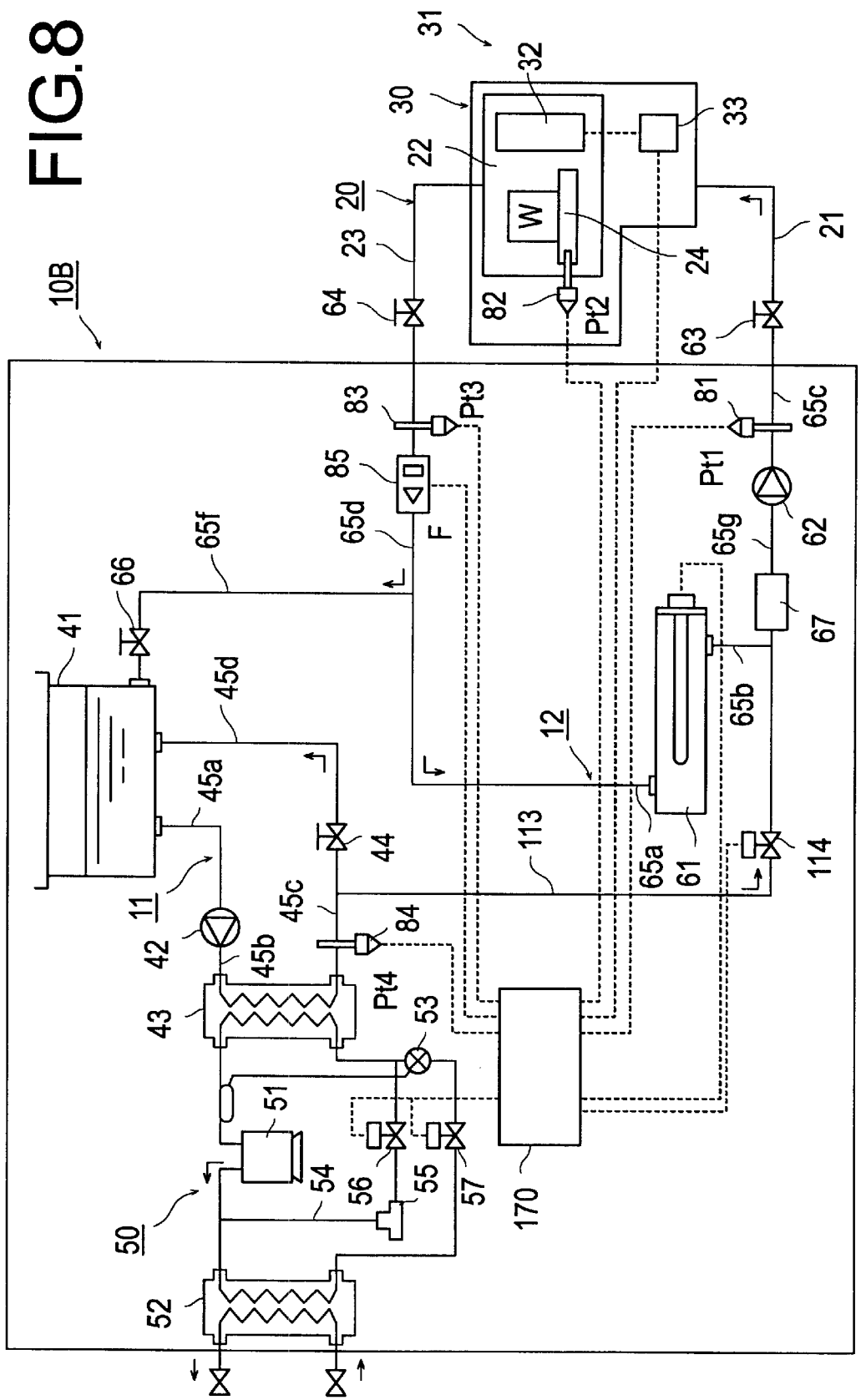
FIG. 8 is a constitutional drawing showing the second embodiment of the brine supply device to which the temperature control device of the invention is applied.

The second embodiment of the brine supply device as a temperature control device will be described referring to FIG. 8. The members that are identical to those used in the first embodiment are identified with the same codes and their descriptions are partially omitted.

The brine supply device 10B includes a primary circuit 11, a secondary circuit 12, a connecting line 113 that connects a primary circuit 11 and a secondary circuit 12, and a valve 114 provided in the connecting line 113 as in the case of the brine supply device 10. The operation of the brine supply device 10B is controlled by a controller 170.

The constituting elements of the secondary circuit 12 are connected by multiple pipes 65*a* through 65*d* as well as 65*g* and are connected with a brine tank 41 through a pipe 65*f* branching off from the pipe 65*d*. The pipe 65*f* has a valve 66 for controlling the flow rate of the brine returning to the brine tank 41.

The connecting line 113 is provided between a pipe 45*c* and the pipe 65*b*. A valve 114 provided in the connecting line 113 is a solenoid valve that turns on and off the communication between the primary circuit 11 and the secondary circuit 12. In order to lower the temperature of the brine to be supplied to the work W, the valve 114 is opened and a portion of the bring that is circulating the primary circuit 11, or the amount necessary for cooling, is introduced into the outlet side of the heater 61 through the connecting line 113.

The second embodiment further includes a buffer tank 67 between the valve 114 and the work W. The buffer tank 67 is placed at a location immediately behind the point where the relatively low temperature brine brought from the primary circuit 11 meets with the relatively high temperature brine from a heater 61. The buffer tank 67 has functions of promoting the mixing of the low temperature brine and the high temperature brine and removing temperature unevenness from the brine to be supplied to a load circuit 20. The capacity of the buffer tank 67 is chosen to be sufficient to provide said functions. It is also possible not to connect the pipe 65*b* and the connecting line 113, but rather connect them independently to the buffer tank 67 and make the low temperature brine and the high temperature brine to mix inside the buffer tank 67 to remove the temperature unevenness. It is also possible to have buffer plates in the buffer tank 67 to promote mixing of the low temperature brine and the high temperature brine.

The return pipe 65*d* is provided with a third temperature sensor 83 to detect the return brine temperature Pt3 in the return pipe 65*d*. The third temperature sensor 83 is also constituted of a resistance thermometer, etc., similar to other temperature sensors 81, 82 and 84. A flow rate sensor 85 is also provided in the return pipe 65*d* to detect the circulating flow F of the brine. The flow rate sensor 85 consists of a common flow meter using an orifice, and a converter that converts the measured amount into an electrical signal to be outputted to the controller 170.

Figure 9:
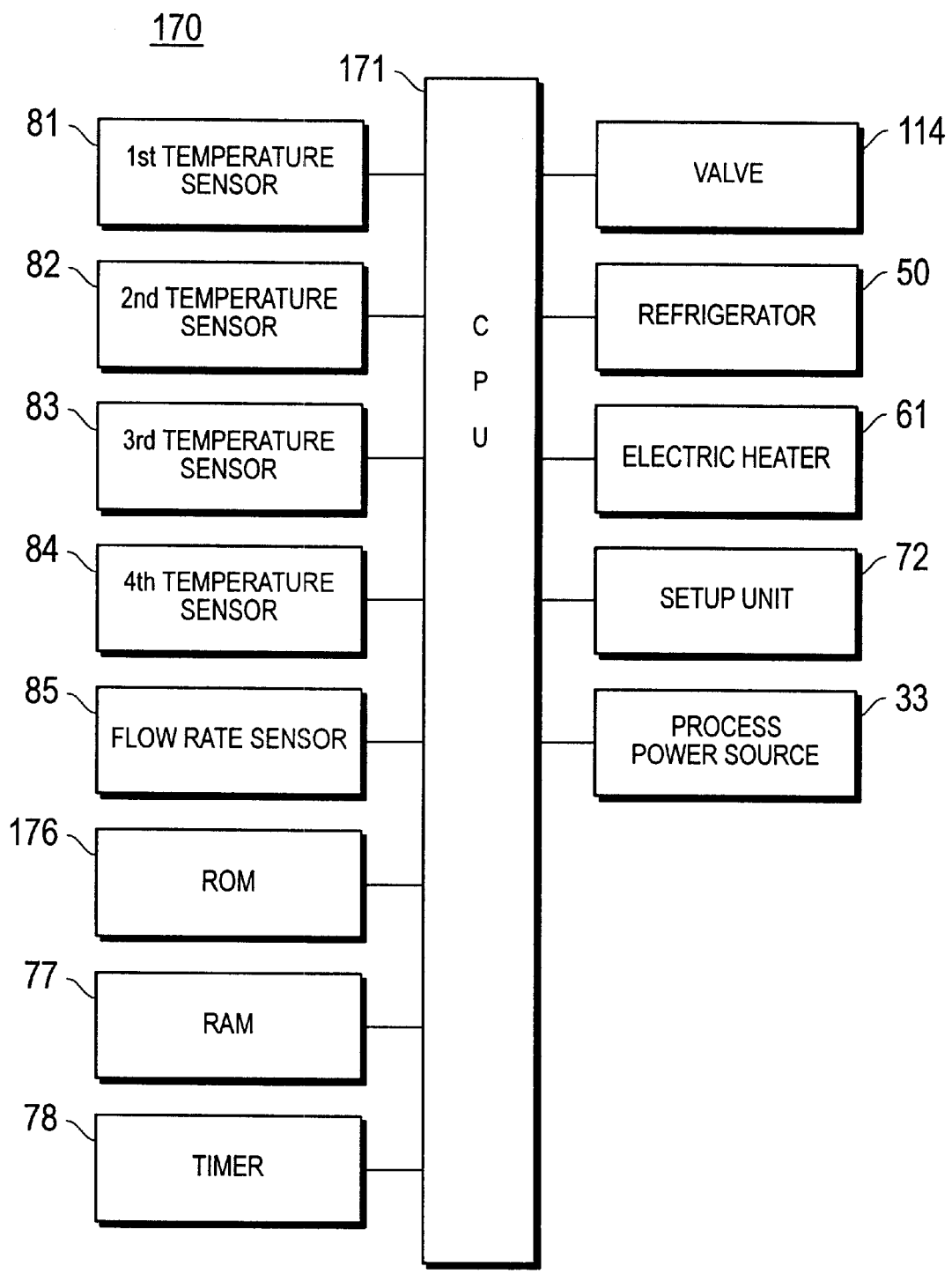
FIG. 9 is a block diagram showing a controller that controls the operation of the brine supply device.

The constitution of the controller 170 that controls the operation of the brine supply device 10B will be described below in reference to FIG. 9.

The sensors 81 through 85 are connected to a CPU 171 to feed the detection signals of the brine supply temperature Pt1, the work temperature Pt2, the brine return temperature Pt3, the brine temperature Pt4 of the primary circuit 11, and the brine circulating flow rate F. The CPU 171 outputs control signals to the refrigerator 50, the electric heater 61 and the valve 114 to control their operations. A ROM 176 stores, in addition to the program for setting up the brine supply temperature predictively, various parameters and programs to control the operation of the brine supply device 10B. The CPU 171 also receives on/off signals corresponding to the power supply from a power source 33 to an electric heater 32 as well as the output value signal of the electric power supplied to the electric heater 32. The CPU 171 detects any change of the heat load applied to the work W by the electric heater 32 and the heat quantity actually added to the work W. The electric heater 32 on the process side will be hereinafter called the process heater 32. The CPU 171 will function as the acquiring unit, calculating unit and controlling unit of the invention.

The basic operating principle of the temperature control system will be described below referring to FIG. 10.

The temperature control device maintains the temperature of the work W to a specified work setup temperature SV(R) by the temperature controlled brine while heat load applied by an external heat source 31 changes.

It acquires a temperature change curve L1 of the work W in advance when the heat load from the external heat source 31 to the work W is changed while the brine supply temperature supplied to the work W is maintained constant.

Figure 10:
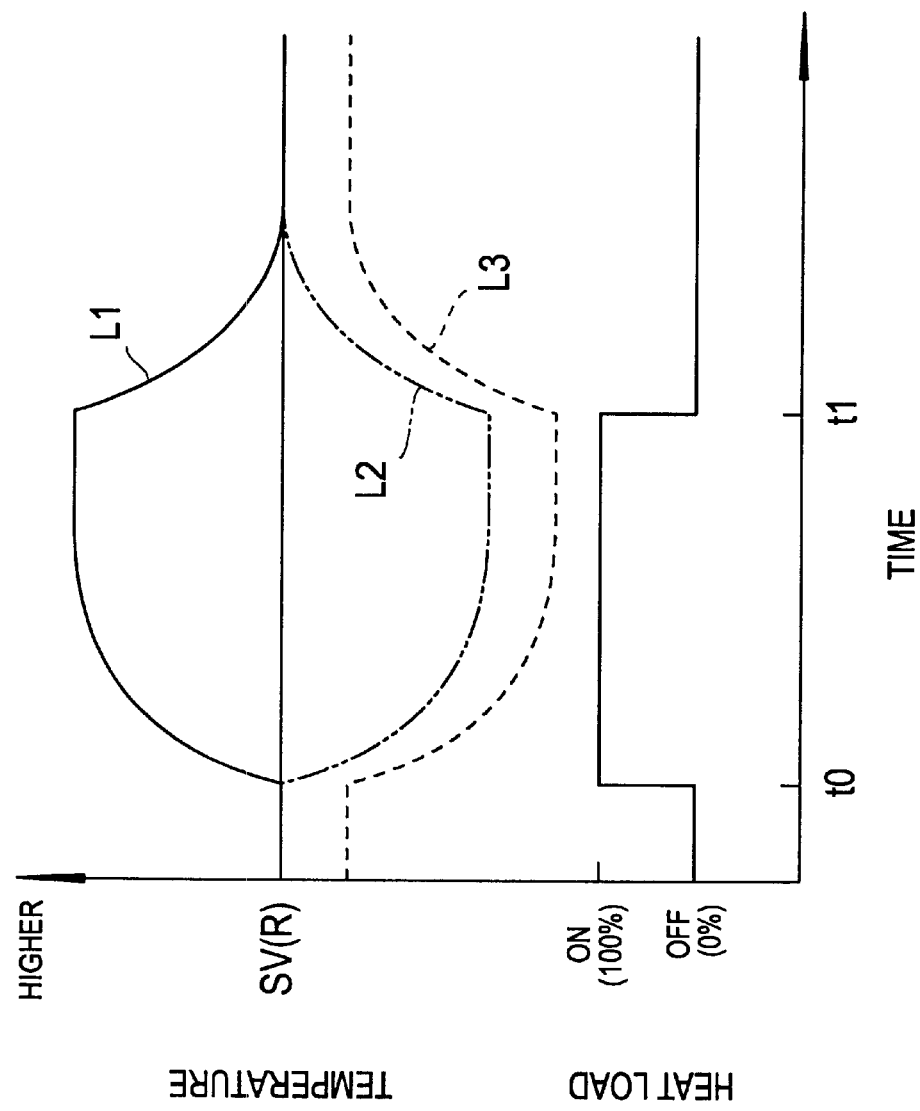
FIG. 10 is a descriptive drawing of the basic operating principle.

The "change of heat load" here, as shown in FIG. 10, can be either a change from an off-state (heat load 0%) as no heat load is applied to the work W at time t0 to an on-state (heat load 100%) as a heat load of a specified quantity of heat is applied, or a change from an on-state (heat load 100%) as a heat load of a specified quantity of heat is applied to the work W at time t1 to an off-state (heat load 0%) as no heat load is applied.

In the former case of heat load change, the first temperature change curve L1 shows a curve that rises in temperature with time and stabilizes at a certain temperature as the heat load application is started while the supply temperature of the brine adjusted to the specified temperature is maintained constant.

In the latter case of heat load change, the first temperature change curve L1 shows a curve that drops in temperature with time and stabilizes at the work setup temperature SV(R) as the heat load application is stopped while maintaining the brine supply temperature constant.

Next, it acquires an imaginary second temperature change curve L2 of the work W, which is in axial symmetry with the first temperature change curve L1, based on the work setup temperature SV(R). Next, a target temperature change curve L3 is calculated to realize the acquired second temperature change curve L2. Although the target temperature change curve L3 is shown on the lower temperature side relative to the second temperature change curve L2 in the conceptual diagram of FIG. 10, it may coincide with or become shifted on the higher temperature side relative to the second temperature change curve L2 depending on the environmental temperature or the setup temperature.

The controller 170 controls the adjusting unit in such a way that the brine supply temperature Pt1 changes according to the target temperature change curve L3 when it detects that the heat load applied to the work W by the external heat source 31 has been changed. This adjusting unit is a general name given to various means required for adjusting the brine supply temperature Pt1 and includes a refrigerator 50, an electric heater 61, and a valve 114.

In case of starting the supply of the heat load by means of a control that sets up the brine target temperature predictively, the heat quantity applied to the work W by the external heat source 31 can be approximately equalized with the heat quantity taken away from the work W by the brine. If the application of the heat load is stopped, the heat quantity dissipated from the work W can be approximately equalized with the heat quantity applied to the work W by the brine. As a result, even if a big heat load change occurs, hunting phenomena in the work temperature are less likely to occur compared to feedback controls such as the PID control, thus making it possible to control the temperature of the work W more constantly and improve the stability of the control for adjusting the work W to the work setup temperature SV(R).

Although there is a case when the heat quantity of the heat load in acquiring the first temperature change curve L1 differs from the heat quantity of the heat load for actually controlling the temperature of the work W, the effect of the difference in heat quantity on the first temperature change curve L1 is known to be proportional. Therefore, the second temperature change curve L2 and the target temperature change curve L3 can be acquired by compensating the first temperature change curve L1 in accordance with the difference in heat quantity. It is also possible to acquire multiple first temperature change curves L1 for different heat quantity in advance and calculate the first temperature change curve L1 by means of interpolation calculation that matches the heat quantity of the heat load that was actually applied based on those multiple first temperature change curves L1.

The operation of the second embodiment will be described below referring to FIG. 11 through FIG. 16, showing a flow chart, FIG. 17, FIG. 18A and FIG. 18B.

The operating mode of the brine supply device 10B is divided into the sampling mode for acquiring data necessary for controlling the brine supply temperature predictively and the work temperature control mode, which is the normal operation. It is necessary to execute the sampling mode when the brine supply device 10B is first installed. In the sampling mode, the brine target temperature when the process side heat load is 0%, i.e., SV(S) [0], and the brine target temperature when the process side heat load is 100%, i.e., SV(S) [100], are determined. Also, the process of acquiring the first temperature change curve L1 of the work W (see FIG. 10) is executed. Further, the time constant T1 in case of lowering the brine supply temperature according to the first temperature change curve L1 and the time constant T2 in case of raising the brine supply temperature are determined as well. The time constants T1 and T2 can be manually inputted from the digital key pad that constitutes the setup unit 72, in addition to automatic acquisition. Moreover, they can be modified as well. The time constants T1 and T2 are stored in a RAM 77. If the process side conditions (heat dissipation, cooling, etc.) do not change, the time constant T1 matches with the time constant T2.

Figure 11:
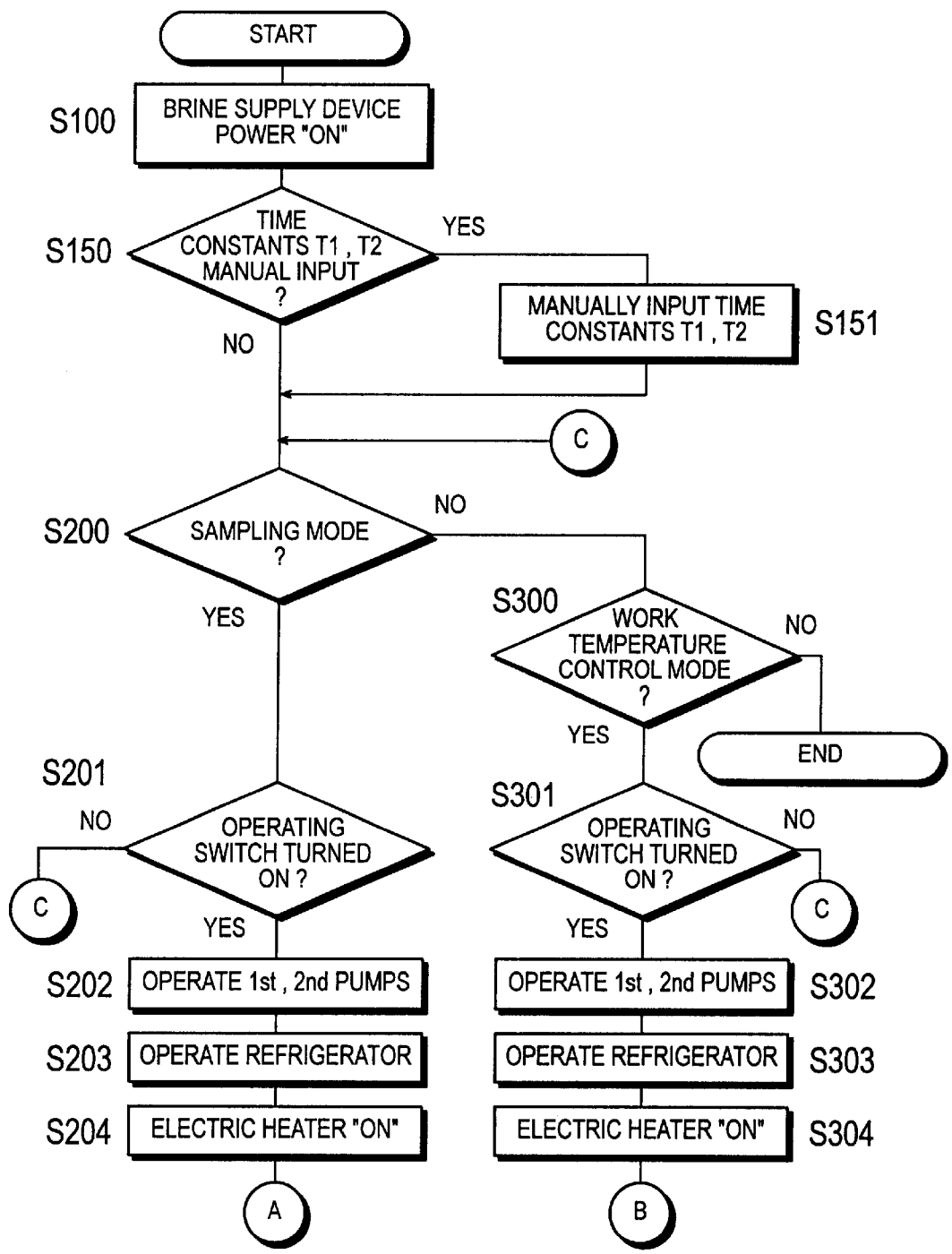
FIG. 11 through FIG. 16 constitute a flowchart describing the operation of the second embodiment.
Figure 12:
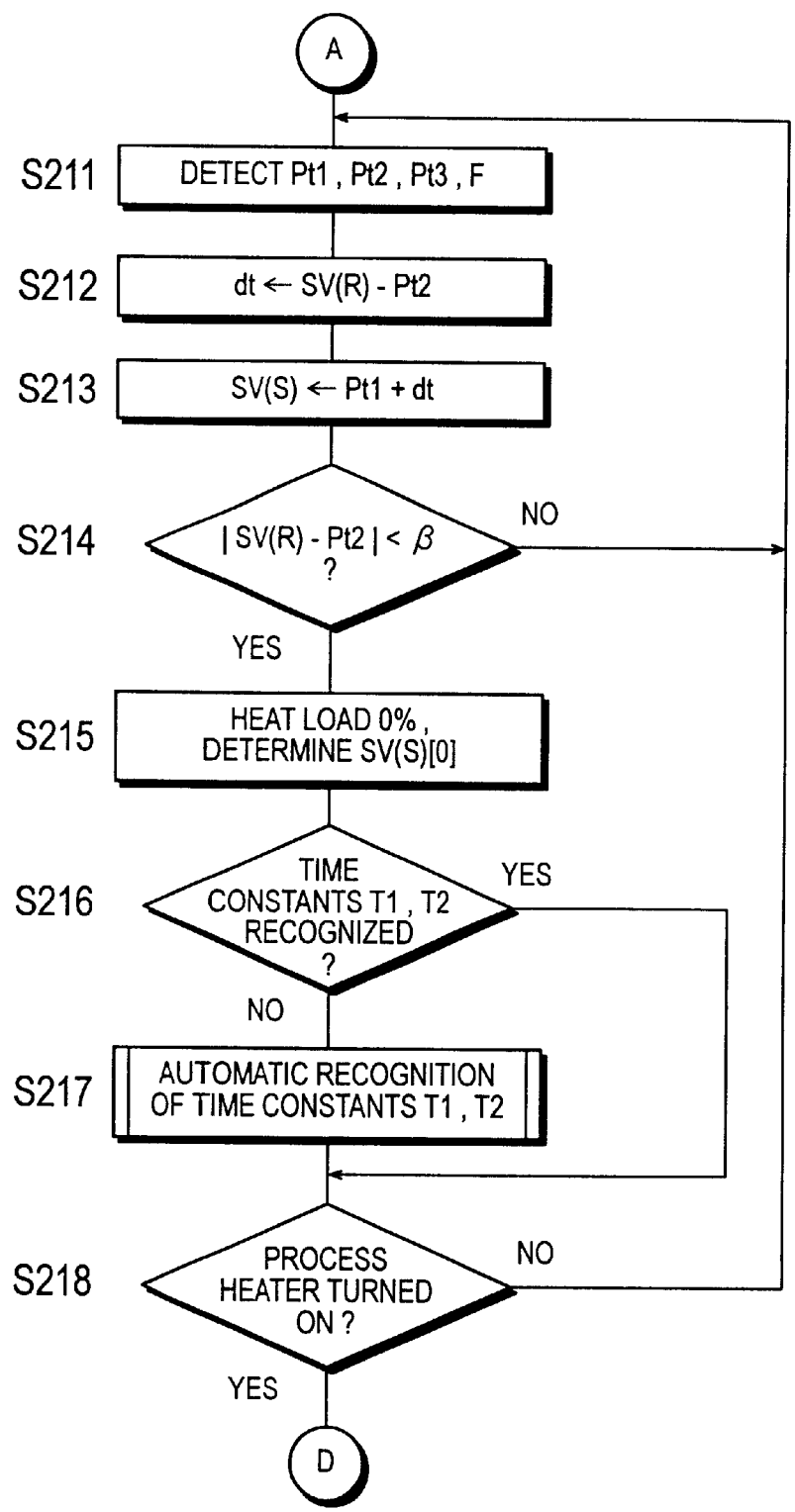

As shown in FIG. 11, the controller 170 makes a judgment whether the time constants T1 and T2 are to be manually inputted (S150), when the power of the brine supply device 10B is turned on (S100). If the manual input is to be made (S150: YES), the input of the time constants T1 and T2 is accepted (S151). The inputted time constants T1 and T2 will be stored in the RAM 77. The controller 170 makes a judgment whether the sampling mode is selected, and a judgment whether the work temperature control mode is selected (S200, S300). If the sampling mode is selected, the control advances to the step S201, and if the work temperature mode is selected, it advances to the step 301.

Sampling Mode

In case of the sampling mode (S200: YES), based on the work setup temperature SV(R) set up by the user, the controller 170 operates a first pump 42 and a second pump 62 (S202) when the operating switch is turned on (S201: YES). The controller 170 operates the refrigerator 50 (S203), turns on the electric heater 61 (S204), and proceeds to the step S211 of FIG. 12. The process heater 32 is kept turned off, and the heat load to the work W is 0%.

In the primary circuit 11, the brine sent out from the brine tank 41 by the first pump 42 is cooled at a heat exchanger 43 by exchanging heat with refrigerant. The circulating brine through pipes 45 (generic name for pipes 45a through 45d) will be cooled to a relatively low temperature as the refrigerator starts to operate.

On the other hand, in the secondary circuit 12, the brine added with Joule heat by the electric heater 61 sends out by the second pump 62 to the load circuit 20 to circulate at a constant flow rate. The brine, which circulates through pipes 65a through 65d, 65g and the load circuit 20, gets heated to a relative temperature due to the operation of the electric heater 61. The control 170 turns the electric heater 61 on and off based on the current brine supply temperature Pt1, the work temperature Pt2 and the work setup temperature SV(R). As the brine supply temperature Pt1 rises, so does the work temperature Pt2 as shown in FIG. 17.

The first temperature sensor 81 detects the brine supply temperature Pt1, the second temperature sensor 82 detects the work temperature Pt2, the third temperature sensor 83 detects the return temperature Pt3, and the flow rate sensor 85 detects the actual brine circulating flow rate F (S211).

The controller 170 calculates the deviation between the work setup temperature SV(R) and the work temperature Pt2, i.e., dt =SV(R)−Pt2 (S212), and determines the brine target temperature SV(S) based on a formula SV(S)=Pt1+ dt=Pt1+(SV(R)−Pt2)(S213).

The controller 170 outputs the manipulated variable based on the determined brine target temperature SV(S) to the electric heater 61. The electric heater 61 is on/off controlled. In order to lower the brine supply temperature Pt1, the controller 170 opens the valve 114 for a certain period of time. A required amount of brine is sent from the primary circuit 11 to the secondary circuit 12 through the connecting line 113.

Next, the controller 170 makes a judgment whether the work temperature Pt2 has reached the work setup temperature SV(R) (S214). More specifically, it makes a judgment whether the absolute value of SV(R)−Pt2 is less than the error tolerance β. The tolerance β is, for example, 0.1 to 0.2° C.

If it has not reached the work setup temperature (S214: NO), the process returns to the step S211, the controller 170 repeats the abovementioned control (S211 through S214: NO).

If it has reached the work setup temperature (S214: YES), the brine target temperature SV(S) is determined as the brine target temperature SV(S) [0] when the process side heat load is 0% (S215), and will be stored in the RAM 77.

Next, the controller 170 makes a judgment whether the time constants T1 and T2 are recognized (S216). If the time constants T1 and T2 are already inputted manually, it will be judged that the time constants T1 and T2 are recognized (S216: YES), and the process advances to the step S218. On the other hand, if the time constants T1 and T2 are not inputted manually, it will be judged that the time constants T1 and T2 are not recognized (S216: NO), and an automatic recognition process for the time constants T1 and T2 (S217) will be performed. The automatic recognition process of the time constants T1 and T2 (S217) will be described later.

Figure 17:
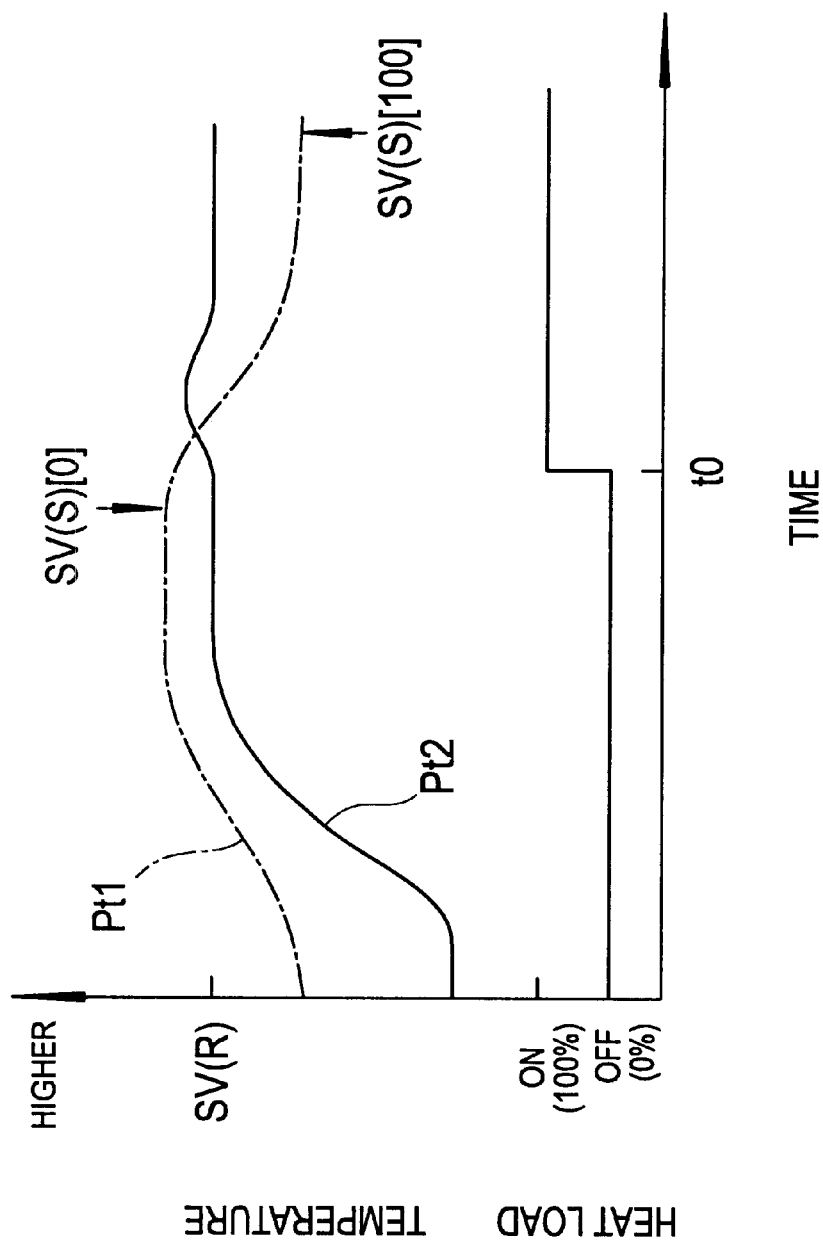
FIG. 17 is a chart conceptually showing an example of the work temperature and a brine supply temperature changes in the sampling mode.
Figure 18A:
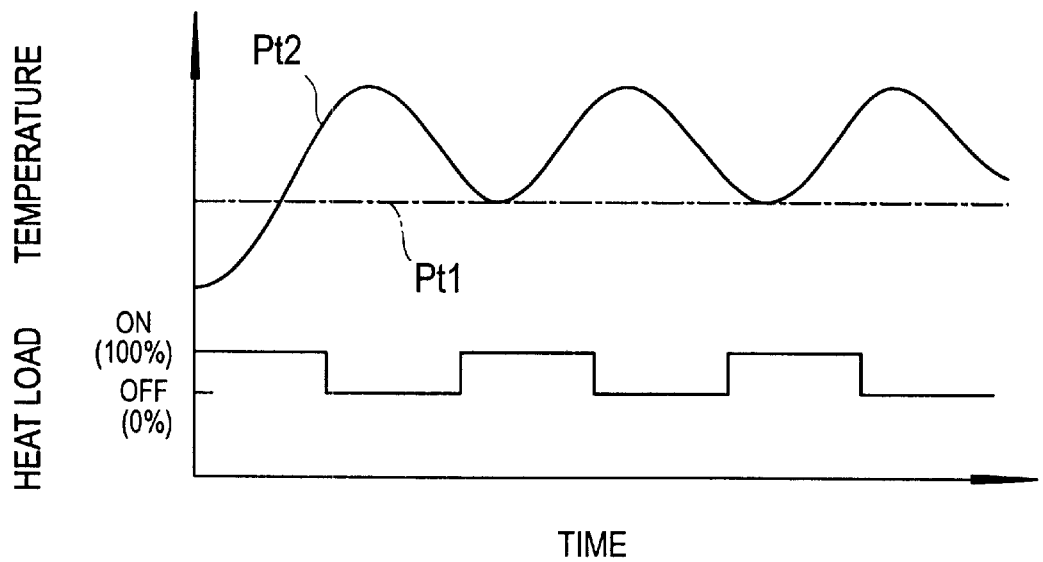
FIG. 18A is a chart conceptually showing an example of the work temperature when the heat load to the work from the external heat source is changed while maintaining the temperature of the brine supplied to the work constant.

As shown in FIG. 17, the process heater 32 will be turned on at time t0 after the brine target temperature SV(S) [0] is determined in order to determine the brine target temperature SV(S) [100] when the process side heat load is 100%. The controller 170 detects that the heat load is applied by detecting the ON signal from the power source 33 (S218: YES), and proceeds to the step S221 of FIG. 13.

Figure 13:
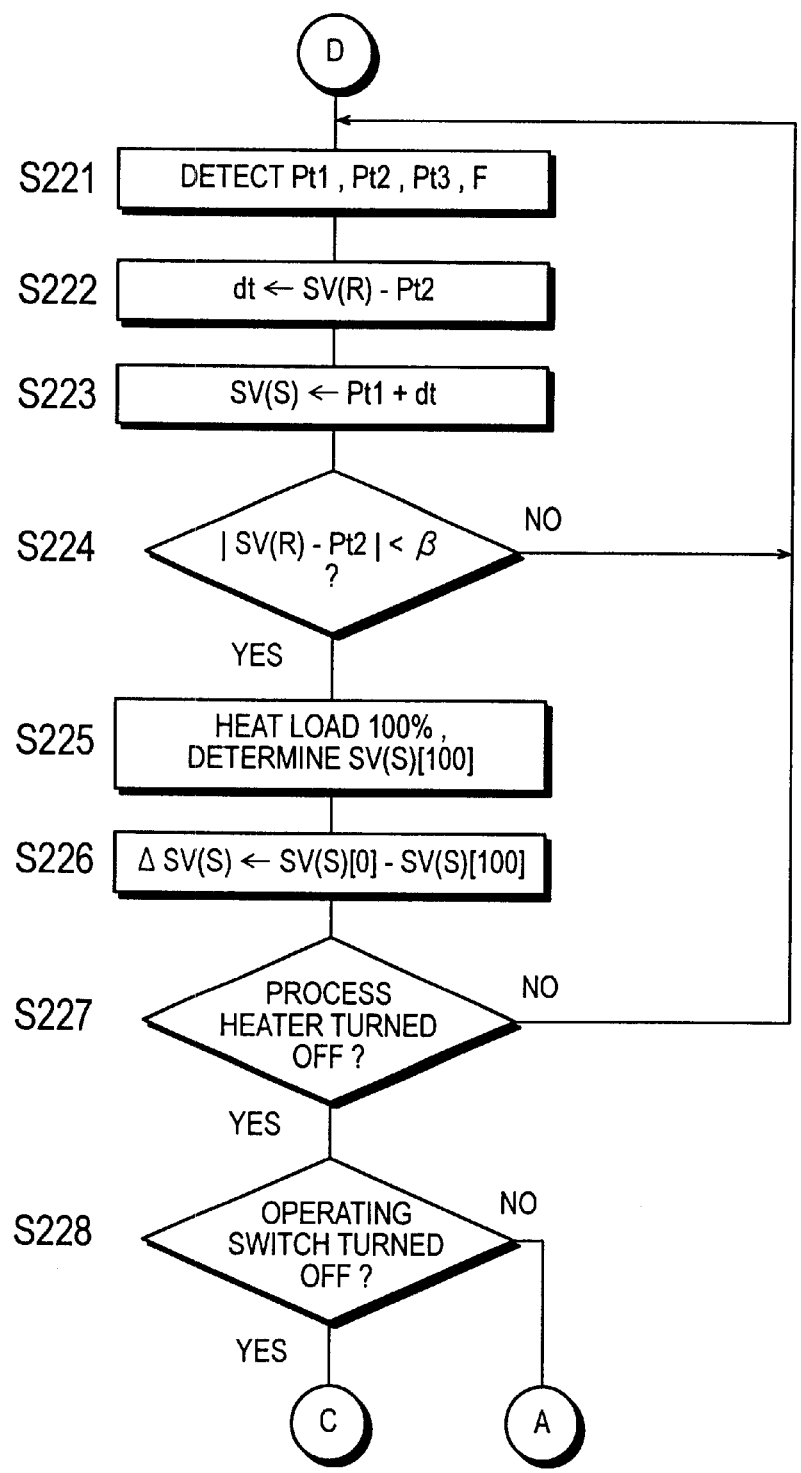

In reference to FIG. 13, the processes similar to the steps S211 through S214 will be performed at steps S221 through S224. If the work temperature Pt2 is adjusted to the work setup temperature SV(R) (S224: YES), the brine target temperature SV(S) is determined as the brine target temperature SV(S) [100] when the process side heat load is 100% (S225), and will be stored in the RAM 77.

Next, the controller 170 set the difference between the SV(S) [0] and the SV(S) [100] as ΔSV(S) (S226), and stores it in the RAM 77.

When the process heater 32 is turned off (S227: YES) and the operation switch is turned off (S228: YES), the sampling mode operation will be terminated and the process returns to the step S200 of FIG. 11.

Automatic Recognition Process of the Time Constants T1 and T2 (S217))

Figure 14:
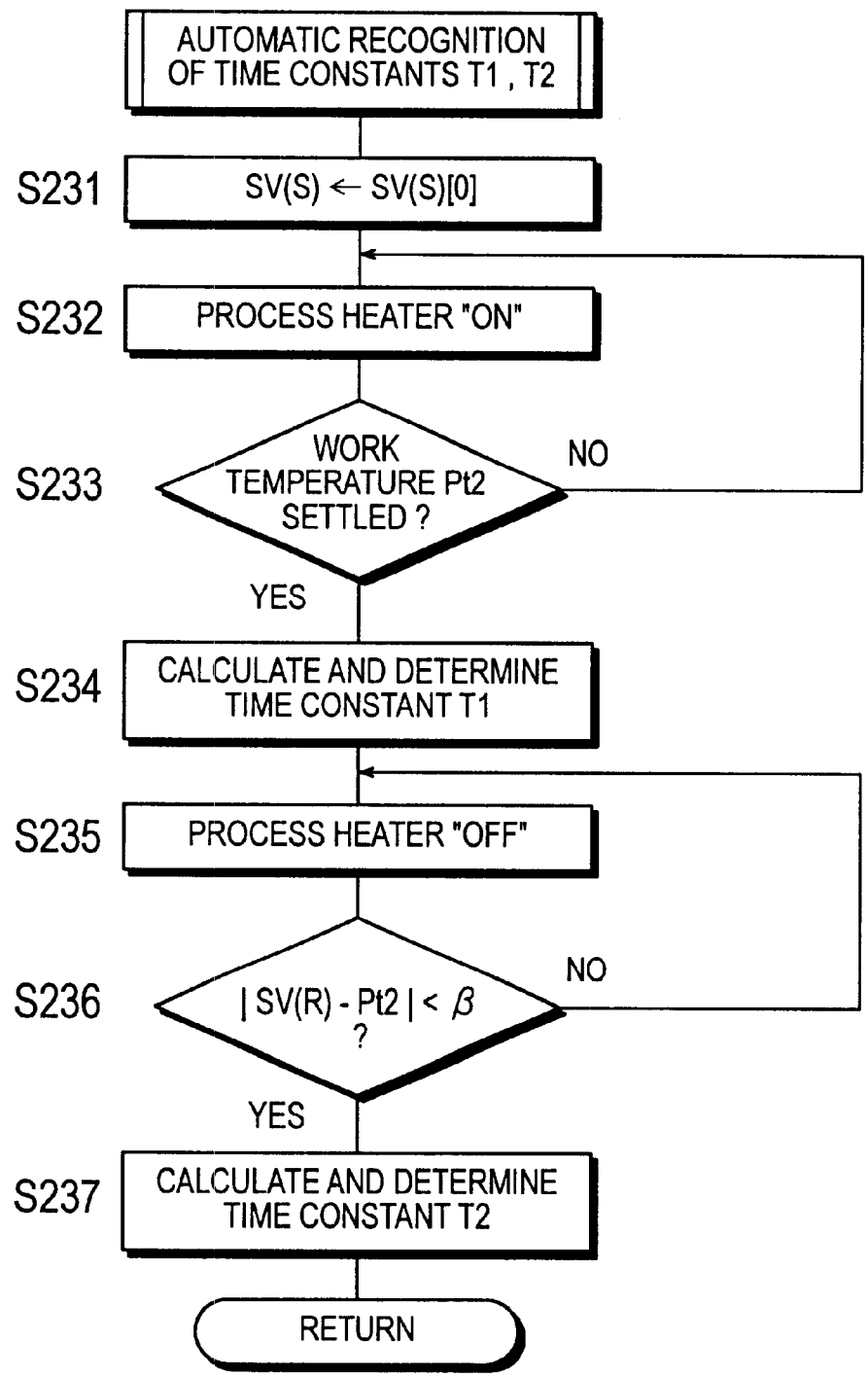
Figure 15:
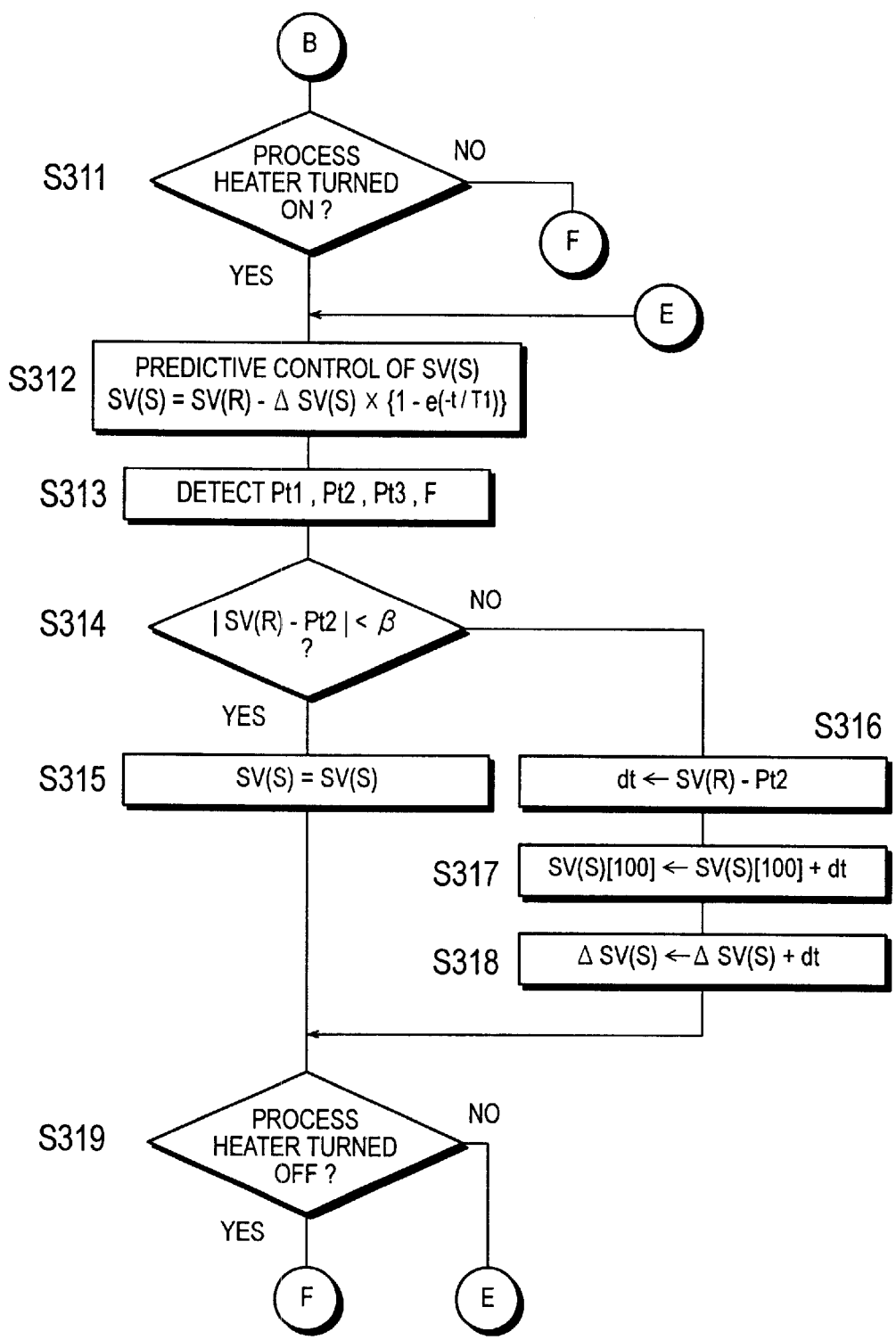
Figure 16:
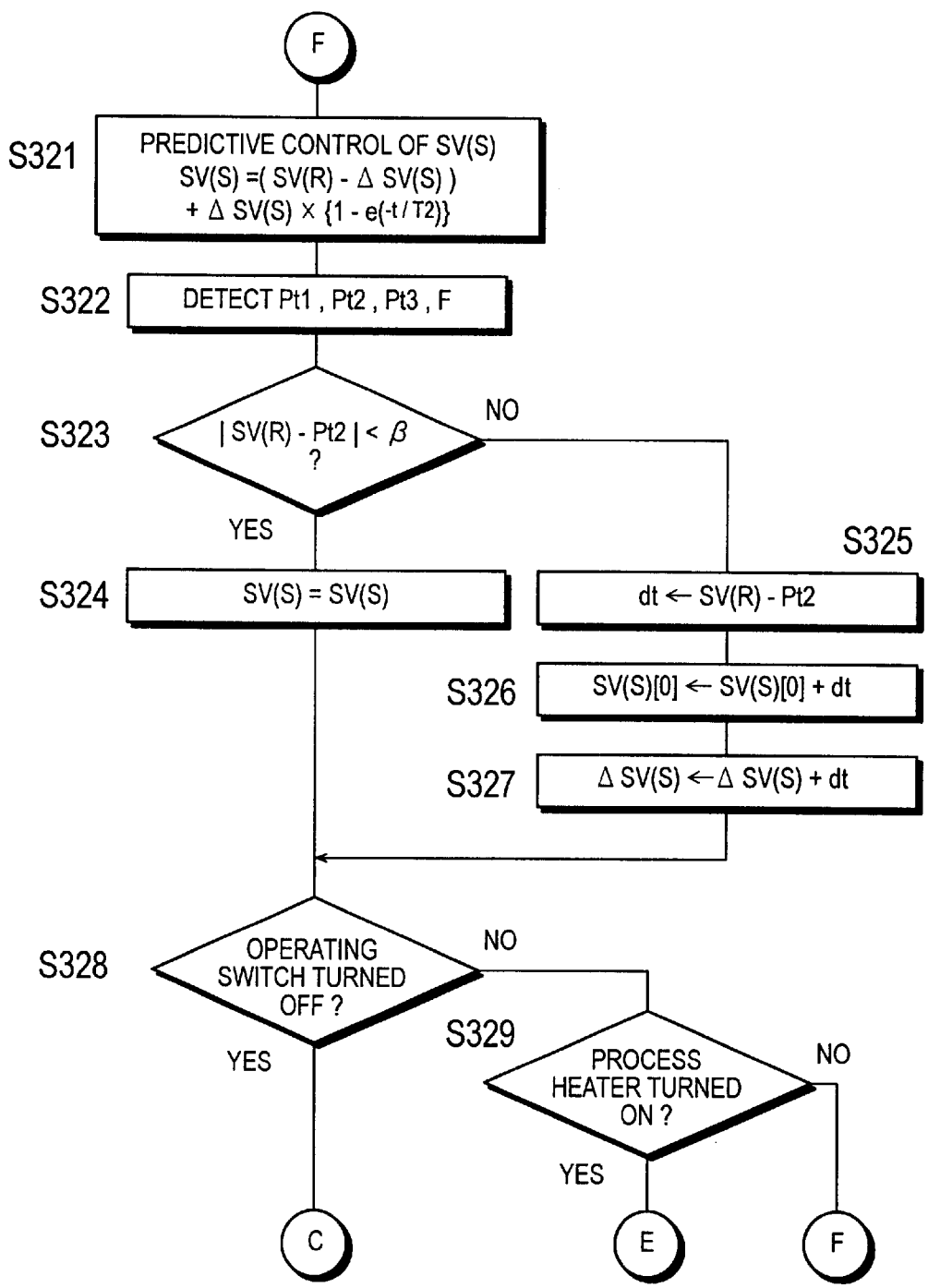

As shown in FIG. 14, set the brine target temperature SV(S) [0] determined at the step S215 to the brine target temperature SV(S) (S231), and turn on the process heater 32 (S232) while maintaining the brine supply temperature Pt1 constant. After turning the heat load from Off to On condition, sampling of the work temperature Pt2 will be conducted at a predetermined time interval. Acquisition of the first temperature change curve L1 as shown in FIG. 10 will be initiated. The work temperature Pt2 will begin to rise as time goes on.

When it is judged that the change of the work temperature Pt2 becomes less than the specified value, and the work temperature Pt2 has settled down (S233: YES), the time constant T1 for lowering the brine supply temperature will be calculated and determined based on the acquired first temperature curve L1 (S234).

After that, the process heater 32 will be turned off while maintaining the brine supply temperature Pt1 constant (S235). Thus, the sampling of the work temperature Pt2 will be continued at a specified time interval even after the process side heat load is switched from the On state to the Off state to continue to acquire the first temperature change curve L1. The work temperature Pt2 lowers with time.

When it is judged that the work temperature Pt2 has been adjusted to the work setup temperature SV(R) (S236: YES), the time constant T2 for raising the brine supply temperature will be calculated and determined based on the acquired first temperature curve L1 (S237).

The acquired first temperature change curve L1 and the data concerning the automatically acquired time constants T1 and T2 will be stored in the RAM 77.

Work Temperature Control Mode

In reference to FIG. 11, while it is in the work temperature control mode (S300: YES), the controller 170, when the operation switch is turned on (S301: YES), turns on the first pump 42 and the second pump 62 (S302), turns on the refrigerator 50 (S303), and turns on the electric heater 61 (S304) similar to steps S202 through S204.

While maintaining the process heater 32 in the Off state, the controller 170 adjust the work temperature Pt2 to the work setup temperature SV(R) performing processes similar to the steps S211 through S214. In other words, the controller 170 repeats the cycle of determining the brine target temperature SV(S) based on the brine supply temperature Pt1, the work temperature Pt2 and the work setup temperature SV(R) as well as the turn on/off control of the electric heater 61 and the turn on/off control of the valve 114 based on the brine target temperature SV(S) determined in the above until the absolute value of the SV(R)−Pt2 becomes less than the error tolerance β in order to adjust the work temperature Pt2 to the work setup temperature SV(R).

After it has reached the stable condition, the controller 170 constantly monitors whether the heat load to the work W by the external heat source 31 is changed.

Figure 18B:
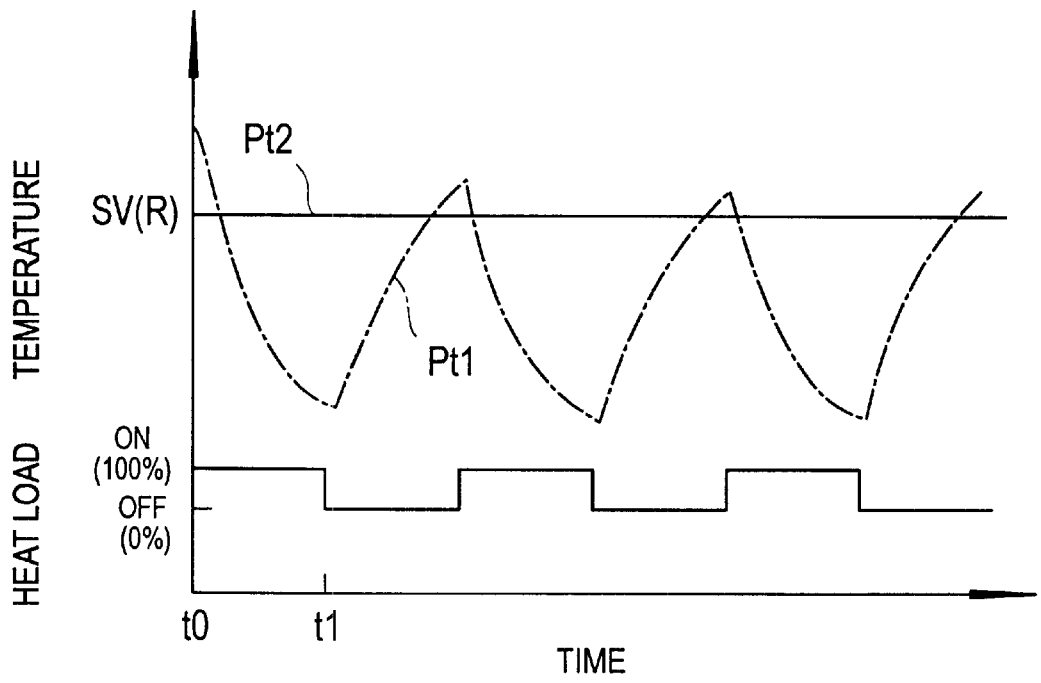
FIG. 18B is a chart conceptually showing an example of the work temperature and the brine supply temperature changes in the work temperature control mode.

When the process heater 32 is turned on at time t0 shown in FIG. 18B, the controller 170 detects that the heat load application has been initiated by detecting the On signal from the power source 33 (S311: YES in FIG. 15).

When the heat load application to the work W is initiated, the heat storage on the work W starts, so that it becomes necessary to lower the brine supply temperature. Hence, the controller 170 calculates the brine target temperature SV(S) based on the SV(S) [0], the SV(S) [100], and the time constant T1 for lowering the brine temperature (S312). It is calculated according to the following formula:

$$SV(S)=SV(R)-\Delta SV(S)\times\{1-e^{(-t/T1)}\}$$

where
SV(R): work setup temperature
ΔSV(S): SV(S) [0]−SV(S) [100]
t: time
T1: time constant for lowering the brine supply temperature.

The controller 170 detects the heat quantity actually applied to the work W based on the output electric power signal from the power source 33 on the process side. If there is a difference between the heat quantity of the heat load when the first temperature change curve L1 is acquired and the detected heat quantity, the controller 170 will compensate the first temperature change curve L1 for the heat quantity difference and will perform the above calculation after the compensation of the SV(S) [100].

The calculated brine target temperature SV(S) will be a temperature that conforms to the brine target temperature curve L3 to realize the second temperature change curve L2, which is in axial symmetry with the first temperature change curve L1, as explained in the description of the basic operation principle.

Next, the controller 170 detects the brine supply temperature Pt1, the work temperature Pt2, the brine return temperature Pt3, and the actual circulating flow F of the brine (S313), and determines whether the work temperature Pt2 has reached the work setup temperature SV(R) (S314). More specifically, a judgment is made whether the absolute value of SV(R)−Pt2 is less than the error tolerance β.

If the work temperature Pt2 is adjusted to the work setup temperature SV(R) (S314: YES), the brine target temperature SV(S) will not be compensated and the existing brine target temperature SV(S) will continue to be used (S315). The controller 170 repeats the above control (S312 through S315, S319: NO) until the process heater 32 is turned off (S319: YES). The on/off control of the electric heater 61 and the on/off control of the valve 114 will be continued based on the brine target temperature SV(S).

If the work temperature Pt2 has not reached the setup temperature SV(R) (S314: NO), the brine target temperature SV(S) will be compensated. In other words, the controller 170 calculates the deviation between the work setup temperature SV(R) and the work temperature Pt2, i.e., dt=SV(R)−Pt2, (S316), sets the SV(S) [100]+dt at the new SV(S) [100](S317), and sets the ΔSV(S)+dt as a new ΔSV(S) (S318).

The controller 170 repeats the above control process until the process heater 32 is turned off (S319: YES) recalculating the brine target temperature SV(S) using the new ΔSV(S) (S312 through S314: NO, S316 through S319: NO).

When the process heater 32 is turned off at time t1 shown in FIG. 18B, the controller 170 detects that the turn off signal from the power source 33 to determine that the application of the heat load is stopped (S319: YES). The process then proceeds to the step S321 shown in FIG. 16.

When the heat load to the work W is stopped, heat dissipation from the work W starts, so that it is necessary to raise the brine supply temperature accordingly. Thus the controller 170 calculates the brine target temperature SV(S) based on the SV(S) [0], the SV(S) [100], and the time constant T2 for raising the brine temperature (S321). It is calculated according to the following formula:

$$SV(S)=(SV(R)-\Delta SV(S))+\Delta SV(S)\times\{1-e^{(-t/T2)}\}$$

where

SV(R): work setup temperature

ΔSV(S): SV(S) [0]−SV(S) [100]

t: time

T2: time constant for raising the brine supply temperature.

The calculated brine target temperature SV(S) is a temperature conforming to the target temperature change curve L3 of the brine.

Next, the controller 170 detects the brine supply temperature Pt1, the work temperature Pt2, the brine return temperature Pt3, and the actual circulating flow F of the brine (S322), and determines whether the work temperature Pt2 has reached the work setup temperature SV(R) (S323). More specifically, a judgment is made whether the absolute value of SV(R)−Pt2 is less than the error tolerance β.

If the work temperature Pt2 is adjusted to the work setup temperature SV(R) (S323: YES), the brine target temperature SV(S) will not be compensated and the existing brine target temperature SV(S) will continue to be used (S324). The controller 170 repeats the above control (S321 through S324, S328: NO, S329: NO) as long as the operation is continued (S328: NO) until the process heater 32 is turned on (S329: YES). The on/off control of the electric heater 61 and the on/off control of the valve 114 will be continued based on the brine target temperature SV(S).

If the work temperature Pt2 has not reached the setup temperature SV(R) (S323: NO), the brine target temperature SV(S) will be compensated. In other words, the controller 170 calculates the deviation between the work setup temperature SV(R) and the work temperature Pt2, i.e., dt=SV(R)−Pt2, (S325), sets the SV(S) [0]+dt at the new SV(S) [0](S326), and sets the ΔSV(S) +dt as a new ΔSV(S) (S327).

The controller 170 repeats the above control process until the process heater 32 is turned on (S329: YES) as long as the operation is continuing (S328: NO) recalculating the brine target temperature SV(S) using the new ΔSV(S) (S321 through S323: NO, S325 through S328: NO, S329: NO).

When the process heater 32 is turned on (S329: YES) while the operation is continuing (S328: NO), the process advances to the step S312 of FIG. 15 to execute the above-mentioned control process to be performed when the heat load application to the work W is initiated.

When the operation switch is turned off (S328: YES), the work temperature control mode operation will be completed and the process returns to the step S200 of FIG. 11.

According to the brine supply device 10B of the second embodiment, the temperature rising characteristic of the work W when the process heater 32 is turned on from the Off state and the temperature dropping characteristic of the work W when the process heater is turned off from the On state while maintaining the brine supply temperature are stored. Therefore, the brine target temperature SV(S) can be calculated to match the heat load change without any delay in timing with the change in the heat load applied by the process heater 32 to the work W, i.e., coinciding with the detection of the start of the heat load application or stop of the heat load application. Thus, since the brine target temperature SV(S) is set up predictively before the temperature change due to the change of the heat load applied to the work W appears on the work W, the difference between the work temperature Pt2 and the work setup temperature SV(R) is not as large in case of feedback controls such as the PID control. Consequently, even if a large heat load change is imposed, the temperature of the work W can be controlled to a set value with lesser hunting than in feedback controls, and a much higher control stability can be achieved in adjusting the work W to the work setup temperature SV(R).

Furthermore, since a small discrepancy between the work temperature Pt2 and the work setup temperature SV(R) is fed back to compensate the brine target temperature SV(S) if the difference between the two temperatures exceeds the error tolerance β, the temperature control of the work W can be done with a high accuracy.

Thus, the brine supply control device 10B provides a high speed following capability responding with temperature changes of the work W to which the applied heat load changes as shown in FIG. 10B, and is capable of further stabilizing the work temperature Pt2. For example, it was proven that it can control the temperature of the work W to such a high accuracy as ±0.5° C. The heat load change, i.e., the on/off switching of the process heater 32 is typically provided at every 5 minutes. The typical heat quantity applied by the process heater 32 is 500 W.

Modified Example

While the work temperature Pt2 is detected by measuring the temperature of the plate 24, on which the work W is mounted, by means of the second temperature sensor 82 in the embodiment described above, the detection of the current temperature of the work W is not limited to such a case. It is possible to make the second temperature sensor 82 contact directly with the work W and directly measure the current temperature of the work W. Moreover, it is possible to determine the current temperature of the work W by measuring the temperature of the brine that comes in contact with the work W.

The invention is not restricted to various embodiments described above, and various modifications and changes can be made without deviating from the technological concept of the invention.

What is claimed is:

1. A temperature control device that maintains the temperature of a load, whose heat load applied by an external heat source varies, to a setup temperature (SV(R)), comprising:
    a supply temperature detection unit that detects the current supply temperature (Pt1) of a heating medium supplied to the load;
    a load temperature detection unit that detects the current temperature (Pt2) of the load;
    an adjusting unit that adjusts the supply temperature (Pt1) of the heating medium;
    an acquiring unit for acquiring in advance a first temperature change curve (L1) of the load when said heat load is changed while maintaining the supply temperature (Pt1) of the heating medium constant;
    a first calculating unit for calculating an imaginary second temperature change curve (L2) of the load, which is in axial symmetry with said first temperature change curve (L1), based on the setup temperature (SV(R)) of the load;
    a second calculating unit for calculating a target temperature change curve (L3) of the heating medium for realizing said second temperature change curve (L2); and
    a control unit for controlling said adjusting unit so that the supply temperature (Pt1) of the heating medium changes according to said target temperature change curve (L3) when the heat load applied to the load by said external heat source is changed.

2. The temperature control device according to the claim 1 wherein
    said control unit detects that the heat load applied by said external heat source to the load has been changed.

3. The temperature control device according to the claim 1 wherein
    said control unit detects heat quantity actually applied to the load by said external heat source.

4. The temperature control device according to the claim 3 wherein
    said first calculating unit compensates the first temperature change curve (L1) based on the heat quantity actually applied to the load.

5. The temperature control device according to the claim 1 wherein
    said adjusting unit comprises a cooling unit that cools the heating medium; and
    a valve that mixes a portion of the medium cooled by said cooling unit to the heating medium supplied to the load.

6. The temperature control device according to the claim 1 wherein
    said adjusting unit comprises a heating unit that heats the heating medium.

7. The temperature control device according to the claim 5 further comprising:
    a buffer tank placed between said valve and the load.

8. The temperature control device according to the claim 7 wherein
    said buffer tank removes temperature unevenness of the heating medium supplied to the load.

9. The temperature control device according to the claim 1 wherein
    said load temperature detection unit detects the current temperature (Pt2) of the load by means of detecting the temperature of the load itself or the temperature of the heating medium that is in contact with the load.

* * * * *